United States Patent
Sawada

(10) Patent No.: US 10,499,014 B2
(45) Date of Patent: Dec. 3, 2019

(54) IMAGE GENERATION APPARATUS

(71) Applicant: FUJITSU TEN LIMITED, Kobe-shi, Hyogo (JP)

(72) Inventor: Yasuyoshi Sawada, Kobe (JP)

(73) Assignee: DENSO TEN Limited, Kobe (JP)

( * ) Notice: Subject to any disclaimer, the term of this patent is extended or adjusted under 35 U.S.C. 154(b) by 403 days.

(21) Appl. No.: 14/978,196

(22) Filed: Dec. 22, 2015

(65) Prior Publication Data
US 2016/0212384 A1    Jul. 21, 2016

(30) Foreign Application Priority Data

Jan. 20, 2015 (JP) .................. 2015-008424

(51) Int. Cl.
| | |
|---|---|
| H04N 7/18 | (2006.01) |
| G06K 9/00 | (2006.01) |
| G06T 7/00 | (2017.01) |
| G06T 7/20 | (2017.01) |
| G06T 3/60 | (2006.01) |
| G06T 5/50 | (2006.01) |

(52) U.S. Cl.
CPC ......... *H04N 7/181* (2013.01); *G06K 9/00805* (2013.01)

(58) Field of Classification Search
CPC .. H04N 7/181; B62D 15/0295; B62D 15/029; G06T 19/003; G06T 15/04; G06T 15/20; G06T 2215/12; B60R 1/00; B60R 2300/602; G06K 9/00805

USPC ....................................................... 348/159
See application file for complete search history.

(56) References Cited

U.S. PATENT DOCUMENTS

| | | | |
|---|---|---|---|
| 7,161,616 B1 * | 1/2007 | Okamoto | ................. B60R 1/00 348/148 |
| 2012/0257058 A1 * | 10/2012 | Kinoshita | ............. G06T 3/0012 348/148 |
| 2012/0274782 A1 * | 11/2012 | Kitaguchi | .......... G06K 9/00624 348/169 |
| 2012/0330541 A1 * | 12/2012 | Sakugawa | ......... B60W 30/0956 701/301 |

FOREIGN PATENT DOCUMENTS

| | | | |
|---|---|---|---|
| JP | 2010-231276 A | 10/2010 |
| JP | 2011-008762 A | 1/2011 |

(Continued)

*Primary Examiner* — Matthew K Kwan
(74) *Attorney, Agent, or Firm* — Oliff PLC

(57) ABSTRACT

An image generation apparatus that is used in a vehicle, the image generation apparatus includes: an image generator that temporally continuously generates a plurality of virtual viewpoint images showing a vicinity of the vehicle viewed from a virtual viewpoint, using a plurality of captured images acquired by a plurality of cameras; and a controller configured to control the image generator to: (i) temporally continuously change a position of the virtual viewpoint so that the plurality of virtual viewpoint images appear to be a moving image showing the vicinity of the vehicle in such a way as to go around the vicinity of the vehicle; (ii) acquire a detection result from a detector that detects an object existing in the vicinity of the vehicle; and (iii) determine a rotation direction of the moving image based on a position of the object detected by the detector.

19 Claims, 21 Drawing Sheets

(56) References Cited

FOREIGN PATENT DOCUMENTS

| | | |
|---|---|---|
| JP | 2011-065520 A | 3/2011 |
| JP | 2011-091527 A | 5/2011 |
| JP | 2011-135253 A | 7/2011 |
| JP | 2014-197817 A | 10/2014 |

* cited by examiner

IMAGE GENERATION APPARATUS

BACKGROUND OF THE INVENTION

1. Field of the Invention

The invention relates to a technology for generating an image showing a vicinity of a vehicle.

2. Description of the Background Art

Conventionally, an image generation apparatus is well-known that generates an image showing a vicinity of a vehicle, such as a car, and that outputs the generated image to a display in the vehicle to display the generated image. A user (mainly a driver) can check the vicinity of the vehicle substantially on a real-time basis, by seeing such an image.

Moreover, recently, an image generation apparatus that combines a plurality of captured images acquired by a plurality of cameras and that generates a virtual viewpoint image showing the vicinity of the vehicle viewed from a virtual viewpoint, is also well-known. As such a virtual viewpoint image, generation of an image showing the vicinity of the vehicle viewed downward (e.g., overhead view image) from a viewpoint outside the vehicle and an image showing the vicinity of the vehicle viewed from a viewpoint inside the vehicle (e.g., image viewed from a viewpoint of a driver), has been proposed.

Another proposal is an image generation apparatus that displays moving image (animation) showing the vicinity of the vehicle in such a way as to go around the vicinity of the vehicle while continuously changing a position of the virtual viewpoint to continuously generate the virtual viewpoint images. By seeing such moving image, the user can easily understand an object, such as a pedestrian and an obstacle in the vicinity of the vehicle.

It takes some time (e.g., approx. 10 seconds) to display the moving image showing the vicinity of the vehicle in such a way as to go around the vicinity of the vehicle, as described above. Therefore, in a case where an object exists in a region of the vicinity of the vehicle that is shown to the user in an end phase of the moving image, the user may be late in understanding existence of the object.

SUMMARY OF THE INVENTION

According to one aspect of the invention, an image generation apparatus is used in a vehicle. The image generation apparatus includes: an image generator that temporally continuously generates a plurality of virtual viewpoint images showing a vicinity of the vehicle viewed from a virtual viewpoint, using a plurality of captured images acquired by a plurality of cameras; and a controller configured to control the image generator to: (i) temporally continuously change a position of the virtual viewpoint so that the plurality of virtual viewpoint images appear to be a moving image showing the vicinity of the vehicle in such a way as to go around the vicinity of the vehicle; (ii) acquire a detection result from a detector that detects an object existing in the vicinity of the vehicle; and (iii) determine a rotation direction of the moving image based on a position of the object detected by the detector.

The rotation direction of the moving image showing the vicinity of the vehicle in such a way as to go around the vicinity of the vehicle is determined based on the position of the object. Thus, the user can immediately see the object existing in the vicinity of the vehicle.

According to another aspect of the invention, the controller is further configured to: (iv) derive a risk level of each of a plurality of objects in a case where the detector has detected the plurality of objects, the risk level being a degree of possibility of each of the plurality of objects to come into contact with the vehicle, and the controller determines the rotation direction of the moving image based on a position of one object of the plurality of objects having a greatest risk level.

Since the rotation direction is determined based on the position of the object having the greatest risk level, the user can immediately see the object having the greatest risk level.

Another aspect of the invention, the controller derives the risk level of each of the plurality of objects based on a position of each of the plurality of objects.

The risk level of each of the plurality of objects is properly derived based on the position of each of the plurality of objects.

Therefore, an object of the invention is to enable a user to immediately understand an object existing in a vicinity of a vehicle.

These and other objects, features, aspects and advantages of the invention will become more apparent from the following detailed description of the invention when taken in conjunction with the accompanying drawings.

DESCRIPTION OF THE EMBODIMENTS

Embodiments of the invention are described with reference to the drawings.

1. First Embodiment

1-1. Configuration

Figure 1:
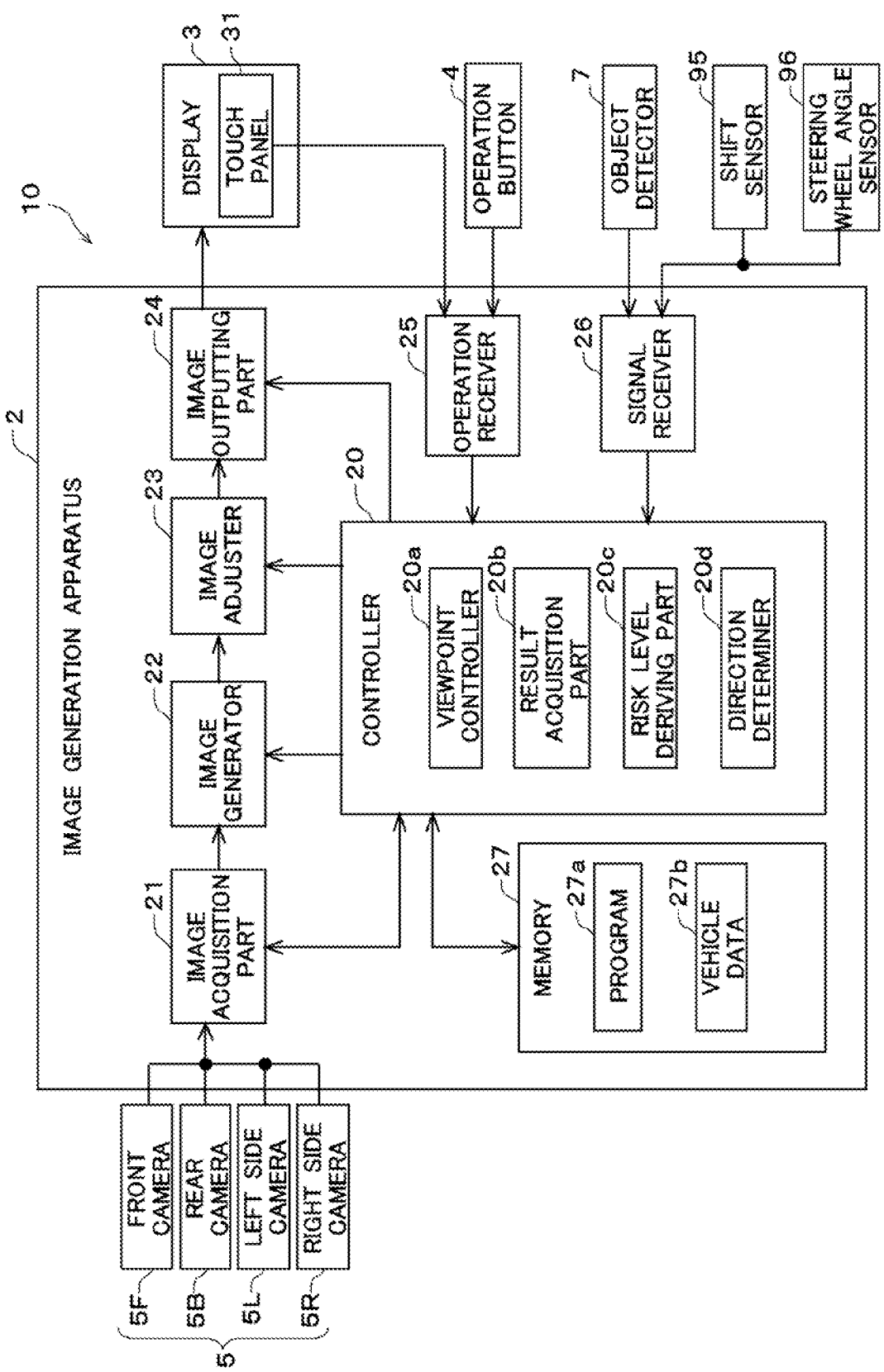
FIG. 1 illustrates a configuration of an image display system.

FIG. 1 illustrates a configuration of an image display system 10 including an image generation apparatus 2 that is a first embodiment. The image display system 10 that is used on a vehicle (car in this embodiment) has a function of generating images showing a vicinity of the vehicle and of displaying the generated images in a cabin of the vehicle. By using the image display system 10, a user of the image display system 10 (typically a driver) can understand the vicinity of the vehicle on a substantially real-time basis.

As shown in FIG. 1, the image display system 10 includes a plurality of cameras 5, a display 3, an operation button 4, an object detector 7 and the image generation apparatus 2.

Each of the plurality of cameras 5 includes a lens and an imaging element, and acquires captured images by capturing images of the vicinity of the vehicle. Each of the plurality of cameras 5 electrically acquires the captured images showing the vicinity of the vehicle and inputs the acquired captured images to the image generation apparatus 2. The plurality of cameras 5 includes a front camera 5F, a rear camera 5B, a left side camera 5L and a right side camera 5R. Each of those four cameras 5 is provided to a position different from one another on a vehicle 9 and captures the images of the vicinity of the vehicle 9 in a different direction from one another.

Figure 2:
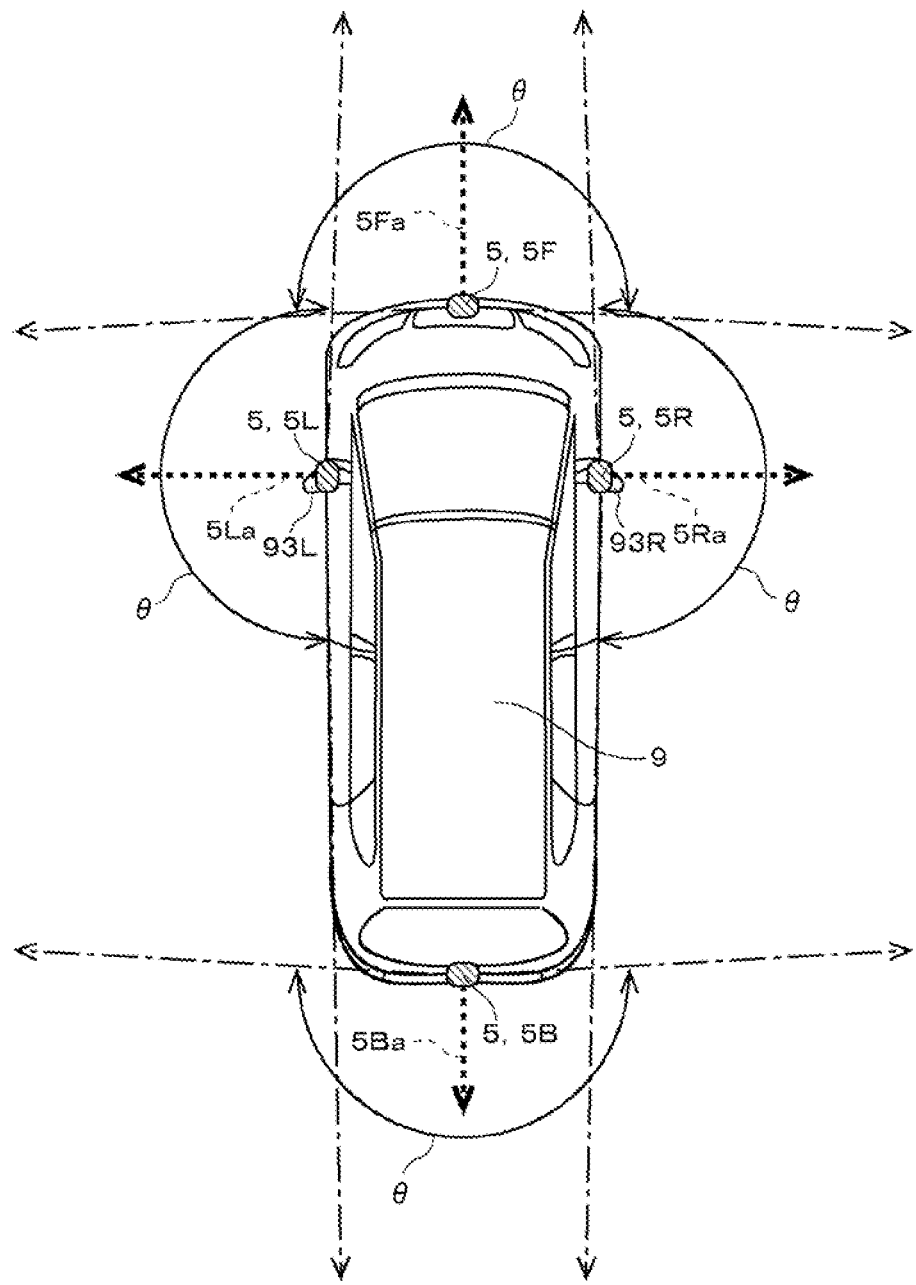
FIG. 2 illustrates directions in which four cameras capture images.

FIG. 2 illustrates directions in which the four cameras 5 capture images. The front camera 5F is provided to a front end of the vehicle 9 having an optical axis 5Fa directed in a front direction along a front-back direction of the vehicle 9. The rear camera 5B is provided to a rear end of the vehicle 9 having an optical axis 5Ba directed in a back direction along the front-back direction of the vehicle 9. The left side camera 5L is provided to a left side mirror 93L of the vehicle 9 having an optical axis 5La directed in a left direction along a right-left direction of the vehicle 9. The right side camera 5R is provided to a right side mirror 93R of the vehicle 9 having an optical axis 5Ra directed in a right direction along the right-left direction of the vehicle 9.

A wide-angle lens, such as a fish lens, is used for each of the plurality of cameras 5 and each of the plurality of cameras 5 has an angle of field of 180 degrees or more. Therefore, it is possible to capture the images of the 360-degree vicinity of the vehicle 9, by using the four cameras 5.

With reference back to FIG. 1, the display 3, for example, includes a thin display panel, such as a liquid crystal display, and displays display images generated by the image generation apparatus 2. The display 3 is disposed to an instrument panel or another position in the vehicle 9 such that the user can see a screen of the display panel. The display 3 may be disposed in a same housing in which the image generation apparatus 2 is disposed and may be integrated with the image generation apparatus 2 as one unit, or the display 3 may be a separate unit from the image generation apparatus 2.

The display 3 includes a touch panel 31 on the display panel and can receive operations made by the user. The display 3 may include another function, such as a navigation function that provides a route guidance leading to a destination, in addition to the function of displaying the display images.

The operation button 4 is an operation member that receives operations made by the user. The operation button 4 is provided, for example, to a steering wheel of the vehicle 9 and receives operations made mainly by the driver. The user can make various operations with the operation button 4 and the touch panel 31 of the display 3 to give commands to the image display system 10. In a case where the user makes an operation with the operation button 4 or the touch panel 31, an operation signal representing a content of the operation is input to the image generation apparatus 2.

The object detector 7 is an electronic apparatus that detects an object such as a pedestrian and/or an obstacle existing in the vicinity of the vehicle 9. The object detector 7 outputs, to the image generation apparatus 2, a signal showing a detection result of the detected object. Details of the object detector 7 will be described later.

The image generation apparatus 2 is an electronic apparatus that performs image processing for generating the display image to be displayed on the display 3, by using the captured images showing the vicinity of the vehicle 9. The image generation apparatus 2 includes an image acquisition part 21, an image generator 22, an image adjuster 23 and an image outputting part 24.

The image acquisition part 21 acquires four captured images acquired by the four cameras 5. The image acquisition part 21 includes a function of image processing, such as conversion of analogue captured images into digital captured images. The image acquisition part 21 performs the predetermined image processing of the acquired captured images and inputs the processed captured images to the image generator 22.

The image generator 22 is a hardware circuit that performs image processing to generate a virtual viewpoint image that shows the vicinity of the vehicle 9 viewed from a virtual viewpoint. The image generator 22 generates the virtual viewpoint image showing the vicinity of the vehicle 9 viewed from the virtual viewpoint, using the four captured images acquired by the four cameras 5. The image generator 22 temporally continuously generates the virtual viewpoint images, using latest captured images acquired by the individual cameras 5. Thus, the image generator 22 generates the virtual viewpoint images showing the vicinity of the vehicle 9 on a substantially real-time basis.

The image adjuster 23 generates the display images to be displayed on the display 3. The image adjuster 23 generates the display images including, for example, the virtual viewpoint images generated by the image generator 22.

The image outputting part 24 outputs the display images generated by the image adjuster 23 to the display 3 and causes the display images to be displayed on the display 3. Thus, the virtual viewpoint images showing the vicinity of the vehicle 9 viewed from the virtual viewpoint are displayed on a substantially real time basis.

Moreover, the image generation apparatus 2 further includes a controller 20, an operation receiver 25, a signal receiver 26 and a memory 27. The controller 20 is, for example, a microcomputer including a CPU, a RAM, a ROM, etc., and comprehensively controls the entire image generation apparatus 2.

The operation receiver 25 receives the operation signal that is sent from the operation button 4 or the touch panel 31 when the user makes an operation. Thus, the operation receiver 25 receives the operation made by the user. The operation receiver 25 inputs the received operation signal to the controller 20.

The signal receiver 26 receives the signal sent from the object detector 7 and also receives signals sent from other apparatuses provided in the vehicle 9. The signal receiver 26 inputs the received signals to the controller 20. Some among the other apparatuses provided in the vehicle 9 are a shift sensor 95 and a steering wheel angle sensor 96.

The shift sensor 95 detects a shift position that is a position of a gear shift lever of the vehicle 9 and sends a signal representing the shift position. Moreover, the steering wheel angle sensor 96 detects a steering wheel angle (operated steering wheel angle) that is a rotated angle from a neutral position of the steering wheel of the vehicle 9 and sends a signal representing the steering wheel angle of the vehicle 9. Therefore, the signal receiver 26 acquires the shift position and the steering wheel angle of the vehicle 9. The controller 20 determines whether forward or backward the vehicle 9 is moving, based on the shift position of the gear shift lever and determines whether leftward or rightward the vehicle 9 is moving, based on the steering wheel angle.

The memory 27 is a non-volatile memory, such as a flash memory, and stores various types of information. The memory 27 stores a program 27a serving as a firmware necessary for a function of the object detector 7 and other data. The memory 27 stores, as data necessary for the function of the object detector 7, vehicle data 27b that shows a shape, a size, etc. of a vehicle body of the vehicle 9.

Various functions of the controller 20 are implemented by execution of the program 27a (arithmetic process of the CPU based on the program 27a) stored in the memory 27. A viewpoint controller 20a, a result acquisition part 20b, a risk level deriving part 20c and a direction determiner 20d, shown in FIG. 1, are among the functions implemented by the program 27a.

The viewpoint controller 20a controls a position of the virtual viewpoint and a direction of a sight line of the virtual viewpoint for the virtual viewpoint image generated by the image generator 22. The result acquisition part 20b acquires the detection result from the object detector 7 that detects an object existing in the vicinity of the vehicle 9. The risk level deriving part 20c derives a risk level of an object detected by the object detector 7. The direction determiner 20d determines a rotation direction of a moving image showing the vicinity of the vehicle 9 in such a way as to go around the vicinity of the vehicle once, based on a position of the object detected by the object detector 7. Processes performed by those functional parts will be described later.

1-2. Object Detector

Figure 3:
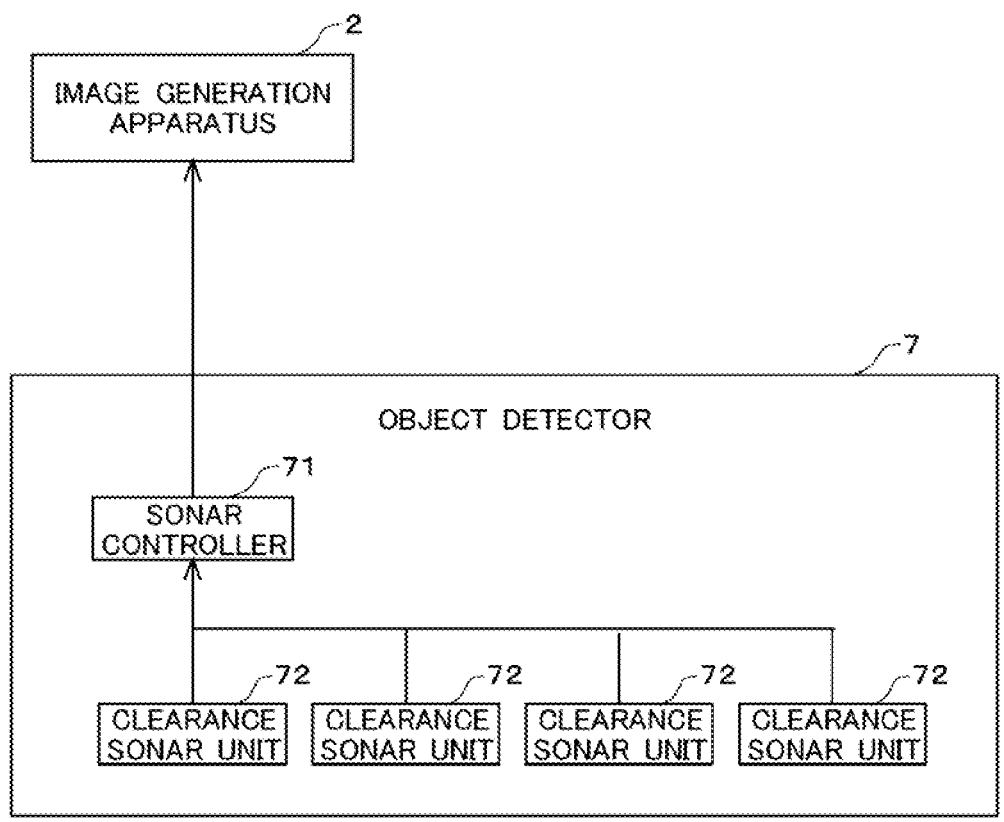
FIG. 3 illustrates a configuration of an object detector.

Next, the object detector 7 is described. FIG. 3 illustrates a configuration mainly of the object detector 7. As shown in FIG. 3, the object detector 7 includes a sonar controller 71 that controls the entire object detector 7 and a plurality of clearance sonar units 72.

Figure 4:
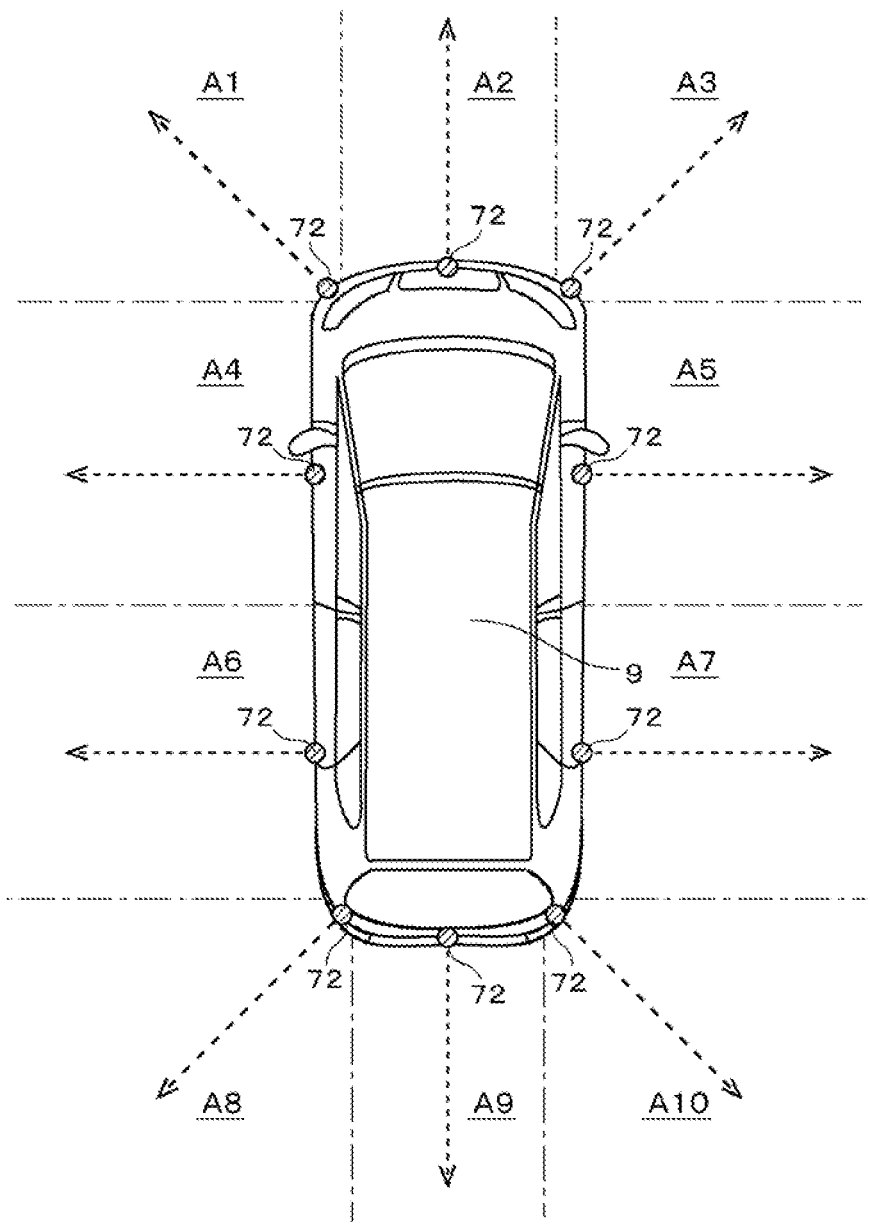
FIG. 4 illustrates positions in which clearance sonar units are provided on the vehicle.

FIG. 4 illustrates positions in which the plurality of clearance sonar units 72 are provided on the vehicle 9. As shown in FIG. 4, the entire vicinity of the vehicle 9 is divided into 10 divided regions A1 to A10. These divided regions A1 to A10 are defined relative to the vehicle 9. Among the 10 divided regions, the divided regions A1, A4, A6 and A8 are on a left side of the vehicle 9, and the divided regions A3, A5, A7 and A10 are on a right side of the vehicle 9.

Moreover, the 10 clearance sonar units 72 are provided so as to correspond to the divided regions A1 to A10, respectively. One clearance sonar unit 72 is provided to each of four corners, the front end and the rear end of the vehicle 9, and two clearance sonar units 72 are provided to each of a left side surface and a right side surface of the vehicle 9.

The plurality of clearance sonar units 72 detect an object existing in the corresponding divided regions A1 to A10, respectively. The plurality of clearance sonar units 72 detect the object by transmitting ultrasonic waves and receiving reflection waves of the ultrasonic waves reflected by the object. Moreover, each of the plurality of clearance sonar units 72 detects a distance from the vehicle 9 to the object based on a time period taken from transmittance of the ultrasonic waves to reception of the reflection waves. Each of the plurality of clearance sonar units 72 inputs the signal showing the detection result to the sonar controller 71.

The sonar controller 71 detects whether or not the object exists in the vicinity of the vehicle 9, based on the signal input from each of the plurality of clearance sonar units 72. Moreover, the sonar controller 71 detects a position of the object relative to the vehicle 9, based on the distance from the vehicle 9 to the object and on the divided region corresponding to the clearance sonar unit 72 that has detected the object.

In a case where the object detector 7 detects an object, the object detector 7 outputs, to the image generation apparatus 2, a signal including information showing that the object detector 7 has detected the object and the position of the detected object as the detection result. The object detector 7 is configured to also simultaneously detect plural objects existing in the vicinity of the vehicle 9. In a case where the object detector 7 detects plural objects, the object detector 7 outputs, to the image generation apparatus 2, the signal including positions of the plural objects.

1-3. Virtual Viewpoint Image

Figure 5:
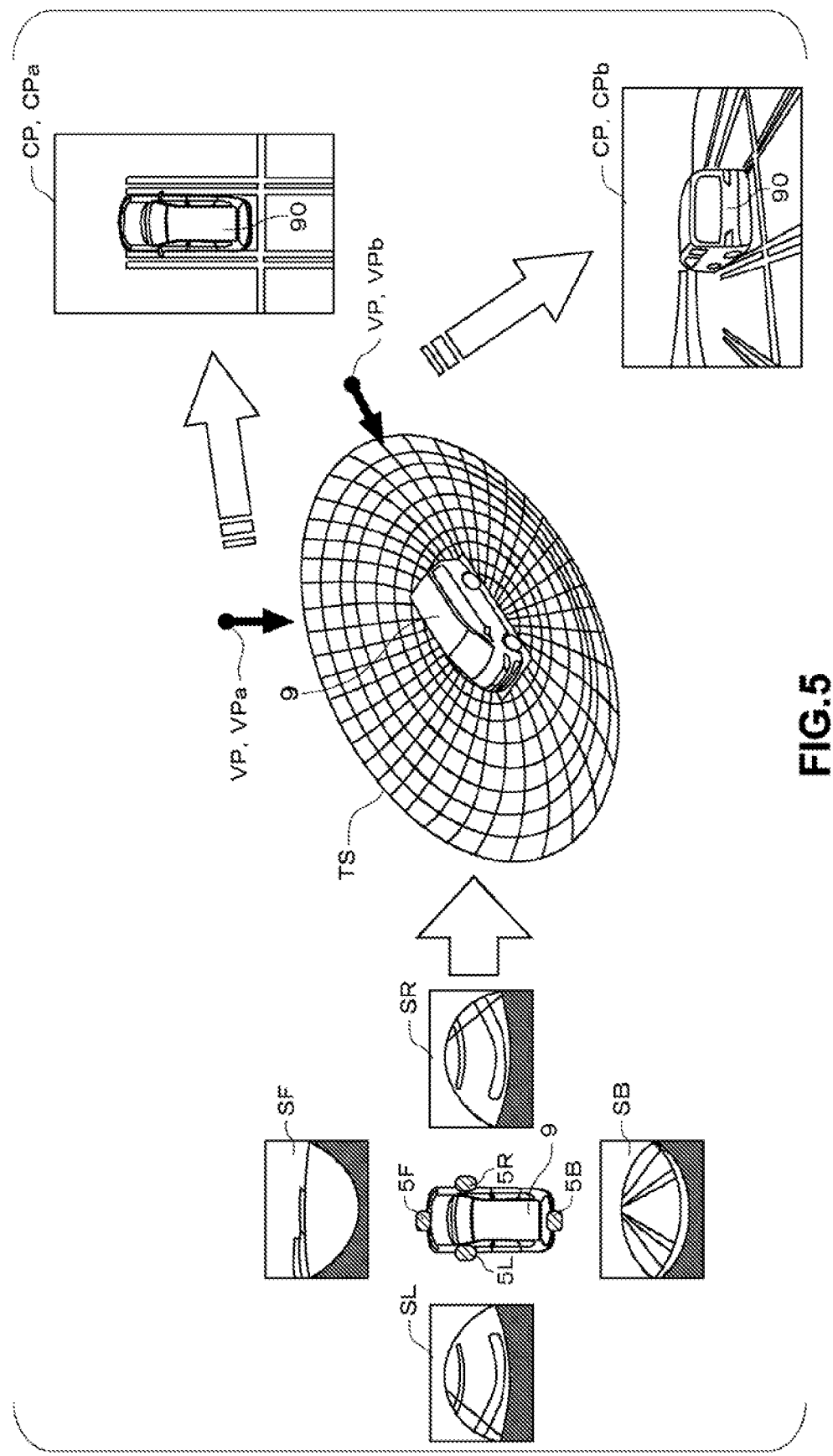
FIG. 5 illustrates a method of generating a virtual viewpoint image.

Next described is a method that is used by the image generator 22 to generate the virtual viewpoint image showing the vicinity of the vehicle 9 viewed from the virtual viewpoint. FIG. 5 illustrates the method that is used by the image generator 22 to generate the virtual viewpoint image. The image generator 22 generates the realistic virtual viewpoint image close to the reality, by using a projection surface TS that is a virtual 3D curved surface.

The front camera 5F, the rear camera 5B, the left side camera 5L and the right side camera 5R acquire four captured images SF, SB, SL and SR showing regions in front, behind, on the left and right sides of the vehicle 9, respectively. These four captured images SF, SB, SL and SR include data of the 360-degree vicinity of the vehicle 9.

The image generator 22 projects the data (pixel values) included in the four captured images SF, SB, SL and SR onto the projection surface TS in a virtual 3D space. The projection surface TS is, for example, substantially hemispherical (bowl-shaped), and a center region of the projection surface TS is defined as a position for the vehicle 9. A region outside the position of the vehicle 9 on the projection surface TS corresponds to the vicinity of the vehicle 9.

Correspondence relation between the data included in the captured images SF, SB, SL and SR and positions on the projection surface TS is defined beforehand. Table data showing such correspondence relation is stored in the memory 27. The image generator 22 projects the data included in the four captured images SF, SB, SL and SR onto the corresponding positions on the projection surface TS, based on the table data.

The image generator 22 projects the data of the captured image SF captured by the front camera 5F onto a region of the projection surface TS corresponding to the region in front of the vehicle 9. The image generator 22 projects the data of the captured image SB captured by the rear camera 5B onto a region of the projection surface TS corresponding to the region behind the vehicle 9. The image generator 22 projects the data of the captured image SL captured by the left side camera 5L to a region of the projection surface TS corresponding to the region on the left side of the vehicle 9. The image generator 22 projects the data of the captured image SR captured by the right side camera 5R onto a region of the projection surface TS corresponding to the region on the right side of the vehicle 9.

Once projecting the data of the captured images onto the projection surface TS as described above, the image generator 22 next configures a virtual polygon model that shows a 3D shape of the vehicle 9 based on the vehicle data 27*b* stored in the memory 27. The model of the vehicle 9 is placed in the center region of the projection surface TS, defined as the position for the vehicle 9 in the virtual 3D space.

Next, the image generator 22 sets a virtual viewpoint VP in the 3D space under control of the viewpoint controller 20*a*. The virtual viewpoint VP is defined by the position and the direction of the sight line. The image generator 22 is configured to set the virtual viewpoint VP, having the sight line in an arbitrary direction, at an arbitrary position in the 3D space.

Next, the image generator 22 generates a virtual viewpoint image CP, using a part of the region of the projection surface TS based on the set virtual viewpoint VP. In other words, the image generator 22 clips data of a region of the projection surface TS in a predetermined view angle viewed from the virtual viewpoint VP, as an image. The clipped image includes an image of an object existing in the vicinity of the vehicle 9. The region in the sight line of the virtual viewpoint VP is located in a center of the clipped image.

In addition, the image generator 22 renders the model of the vehicle 9 based on the set virtual viewpoint VP and superimposes a 2D vehicle image 90 that is a result of rendering, on the clipped image. The vehicle image 90 shows the shape of the vehicle body of the vehicle 9 viewed from the virtual viewpoint VP. Thus, the image generator 22 generates the virtual viewpoint image CP showing the vicinity of the vehicle 9 and the vehicle body of the vehicle 9 viewed from the virtual viewpoint VP.

For example, as shown in FIG. 5, in a case where a virtual viewpoint VPa, located directly above the vehicle 9 and having the sight line directed downward, is set, the image generator 22 generates a virtual viewpoint image (overhead view image) CPa showing an overhead view of the vicinity of the vehicle 9 and the vehicle body of the vehicle 9. Moreover, in a case where a virtual viewpoint VPb, located left behind the vehicle 9 and having the sight line directed toward a center of the vehicle 9, is set, the image generator 22 generates a virtual viewpoint image CPb showing the vicinity of the vehicle 9 and the vehicle shape viewed from a viewpoint left behind the vehicle 9.

1-4. Rotation Mode

Figure 6:
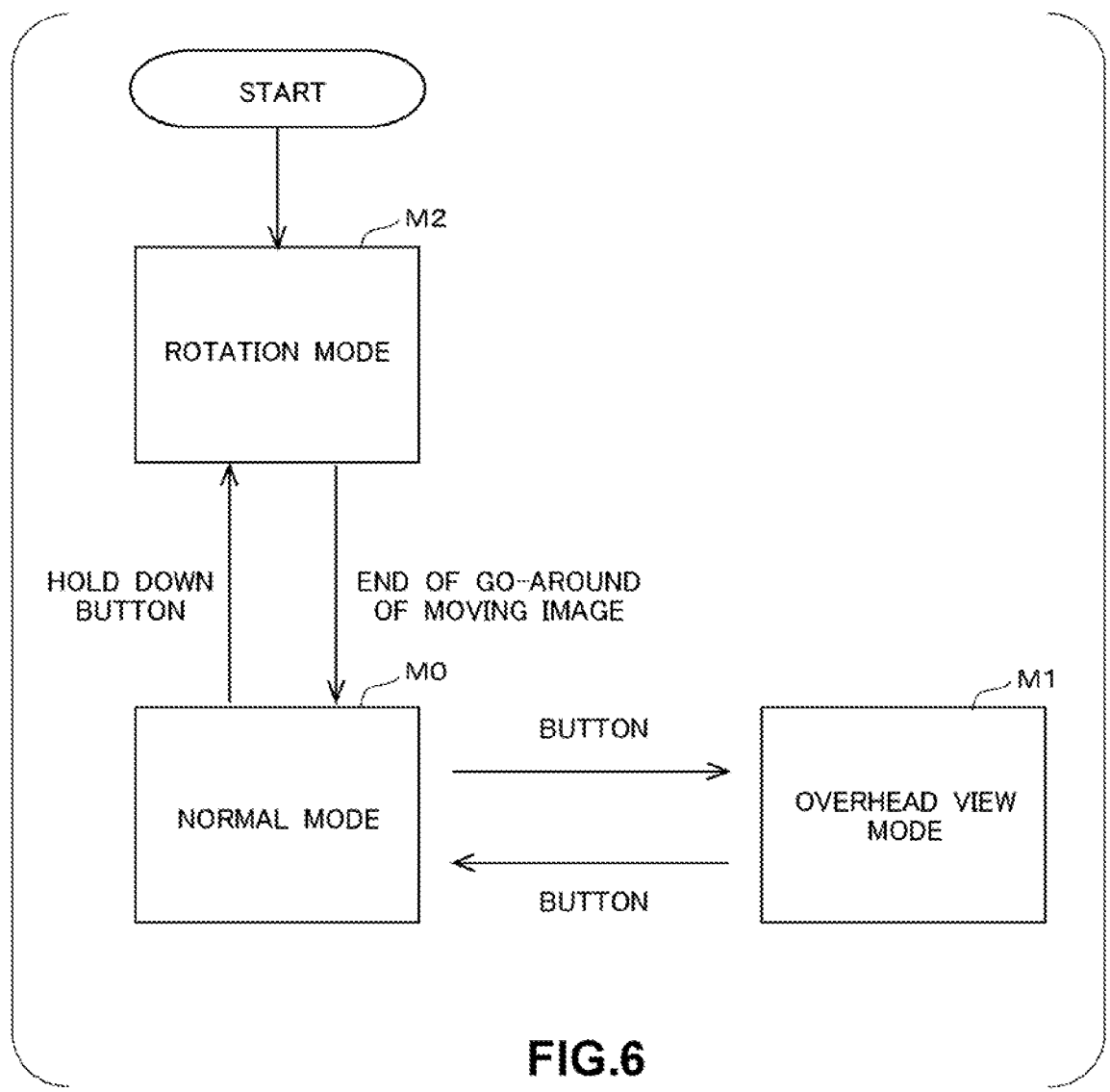
FIG. 6 illustrates changes of operation modes of the image display system.

Next described is a rotation mode that is one of operation modes of the image display system 10. FIG. 6 illustrates changes of the operation modes of the image display system 10. The image display system 10 has three operation modes of a normal mode M0, an overhead view mode M1 and a rotation mode M2. The controller 20 of the image generation apparatus 2 changes one mode to another based on a state of the vehicle 9 or an operation of the user.

The normal mode M0 is an operation mode that does not use the image processing function of the image generation apparatus 2. In a case where the display 3 includes a navigation function, the display 3 displays a map image and the like based on the navigation function in the normal mode M0.

On the other hand, the overhead view mode M1 and the rotation mode M2 are operation modes that use the image processing function of the image generation apparatus 2. In these operation modes, the display 3 temporally continuously displays the virtual viewpoint images temporally continuously generated by the image generation apparatus 2, and thus the vicinity of the vehicle 9 is shown to the user on a substantially real-time basis. In the overhead view mode M1, the virtual viewpoint VP is not changed and the vicinity of the vehicle 9 viewed downward from a viewpoint directly above the vehicle 9 is displayed. On the other hand, in the rotation mode M2, the virtual viewpoint VP is temporally continuously changed and thus the vicinity of the vehicle 9 is displayed in such a way as to go around the vicinity of the vehicle 9.

As shown in FIG. 6, when the user presses the operation button 4 in a normal time period in the normal mode M0, the operation mode is changed to the overhead view mode M1. Moreover, when the user presses the operation button 4 in the overhead view mode M1, the operation mode is changed to the normal mode M0.

On the other hand, in a case where the user holds down the operation button 4 (continuously presses the operation button 4 for a predetermined or more time period) in the normal mode M0, the operation mode is changed to the rotation mode M2. Moreover, the rotation mode M2 is an initial operation mode when the image display system 10 is started. Moving image (animation) showing the vicinity of the vehicle 9 is displayed in such a way as to go around the vicinity of the vehicle 9 in the rotation mode M2 and once go-around of the moving image ends, the operation mode is changed to the normal mode M0.

Figure 7:
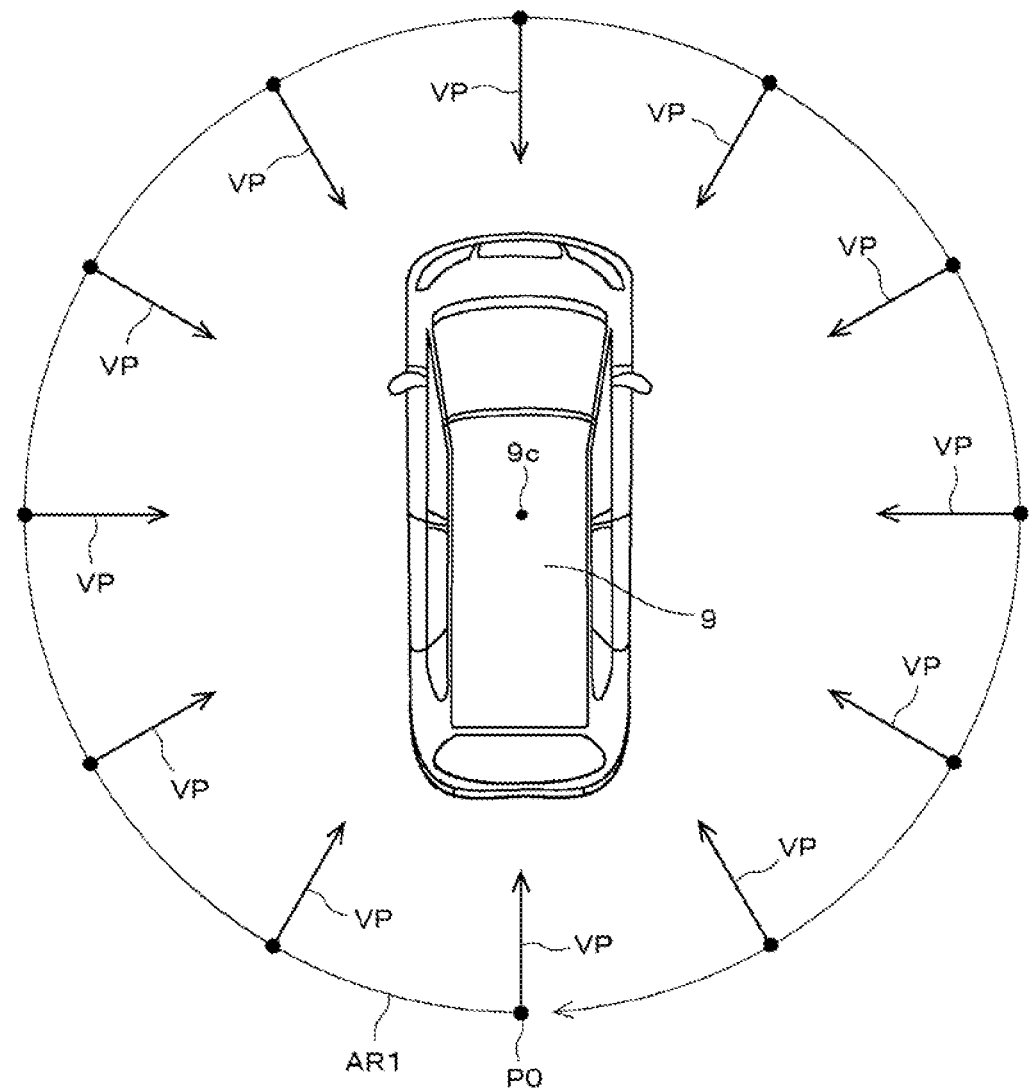
FIG. 7 illustrates an example of change of a virtual viewpoint in a rotation mode in a first embodiment.

FIG. 7 illustrates an example of change of a position of the virtual viewpoint VP in the rotation mode M2. In the rotation mode M2, first, the viewpoint controller 20*a* sets the virtual viewpoint VP to an initial position P0 that is positioned above and behind the vehicle 9 such that the sight line of the virtual viewpoint VP is directed toward a center 9*c* of the vehicle 9. Then, the viewpoint controller 20*a* temporally continuously changes the position and the direction of the sight line of the virtual viewpoint VP. Specifically, while changing the direction of the sight line of the virtual viewpoint VP such that the sight line of the virtual viewpoint VP is directed toward the center 9*c* of the vehicle 9, the viewpoint controller 20*a* moves the position of the virtual viewpoint VP so that the virtual viewpoint VP goes around the vicinity of the vehicle 9 once. Thus, the sight line (a region shown in a center of the virtual viewpoint image CP) of the virtual viewpoint VP goes around the vicinity of the vehicle 9.

Figure 8:
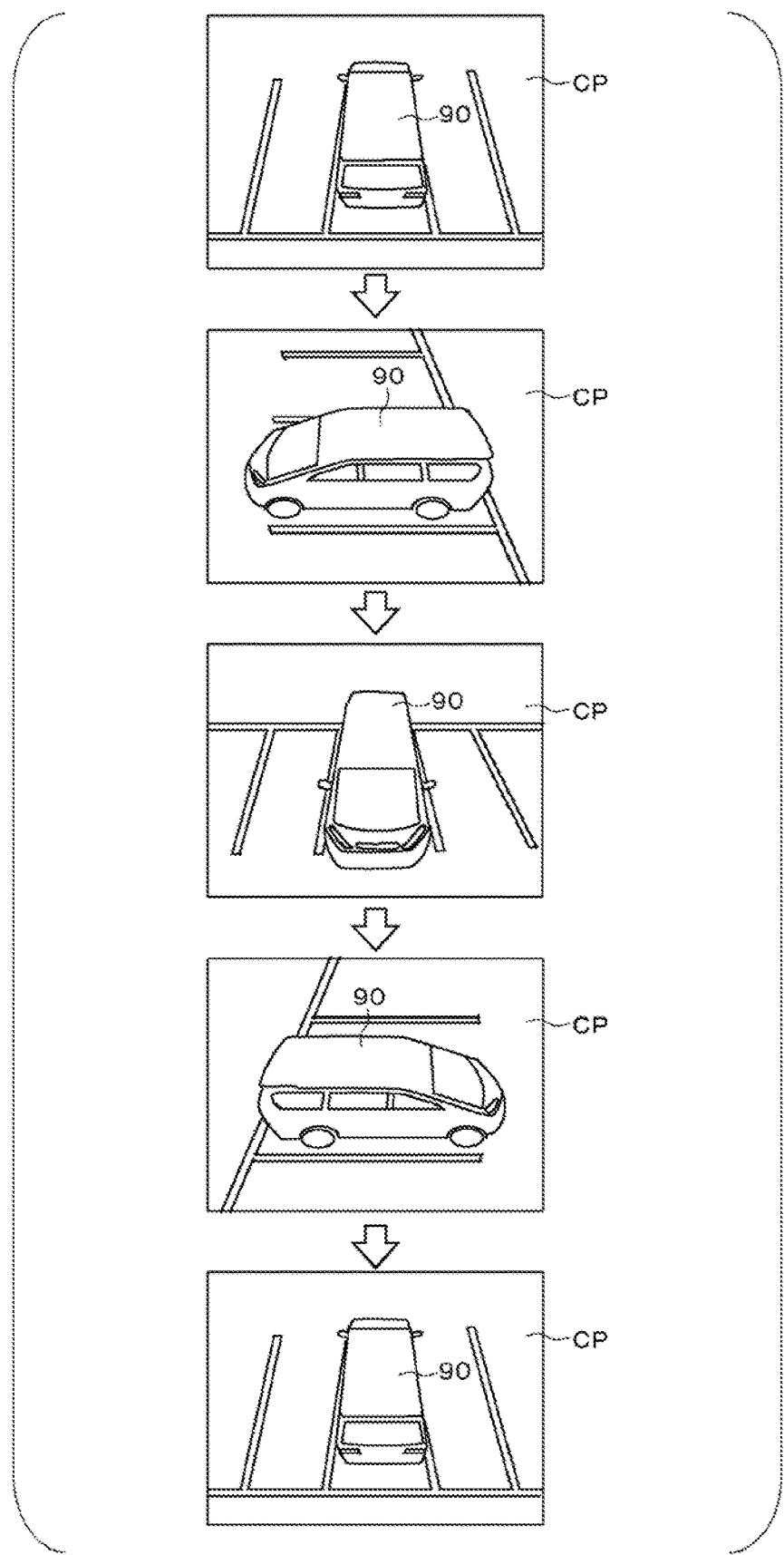
FIG. 8 illustrates examples of a plurality of virtual viewpoint images generated in the rotation mode.

As described above, while the viewpoint controller 20*a* temporally continuously changes the virtual viewpoint VP, the image generator 22 temporally continuously generates a plurality of the virtual viewpoint images CP. Thus, for example, the plurality of the virtual viewpoint images CP, as shown in FIG. 8, are generated. Since the plurality of the virtual viewpoint images CP are temporally continuously displayed on the display 3, the plurality of the virtual viewpoint images CP appear to be a moving image showing the vicinity of the vehicle 9 in such a way as to go around the vicinity of the vehicle 9 (hereinafter referred to as "rotating image"). By seeing such a rotating image, the user can intuitively understand the object existing in the vicinity of the vehicle 9.

In FIG. 7, while changing the direction of the sight line of the virtual viewpoint VP "clockwise," the viewpoint controller 20a moves the position of the virtual viewpoint VP "clockwise" so that the virtual viewpoint VP goes around the vicinity of the vehicle 9 (an arrow AR1). On the other hand, as shown in FIG. 9, while changing the direction of the sight line of the virtual viewpoint VP "counterclockwise," the viewpoint controller 20a also moves the position of the virtual viewpoint VP "counterclockwise" so that the virtual viewpoint VP goes around the vicinity of the vehicle 9 (an arrow AR2).

As shown in FIG. 7, when the virtual viewpoint VP is changed, the rotating image is shown to the user in an order of the region behind the vehicle 9, the regions on the left side of the vehicle 9, the region in front of the vehicle 9, the regions on the right side of the vehicle 9 and then the region behind the vehicle 9, as shown in FIG. 8. Hereinafter, changing the virtual viewpoint VP as shown in FIG. 7 is referred to as "to set the rotation direction of the rotating image to a clockwise direction." In a case where the rotating image is set to the "clockwise" direction, the regions on the left side of the vicinity of the vehicle 9 are shown to the user prior to the regions on the right side of the vicinity of the vehicle 9.

Figure 9:
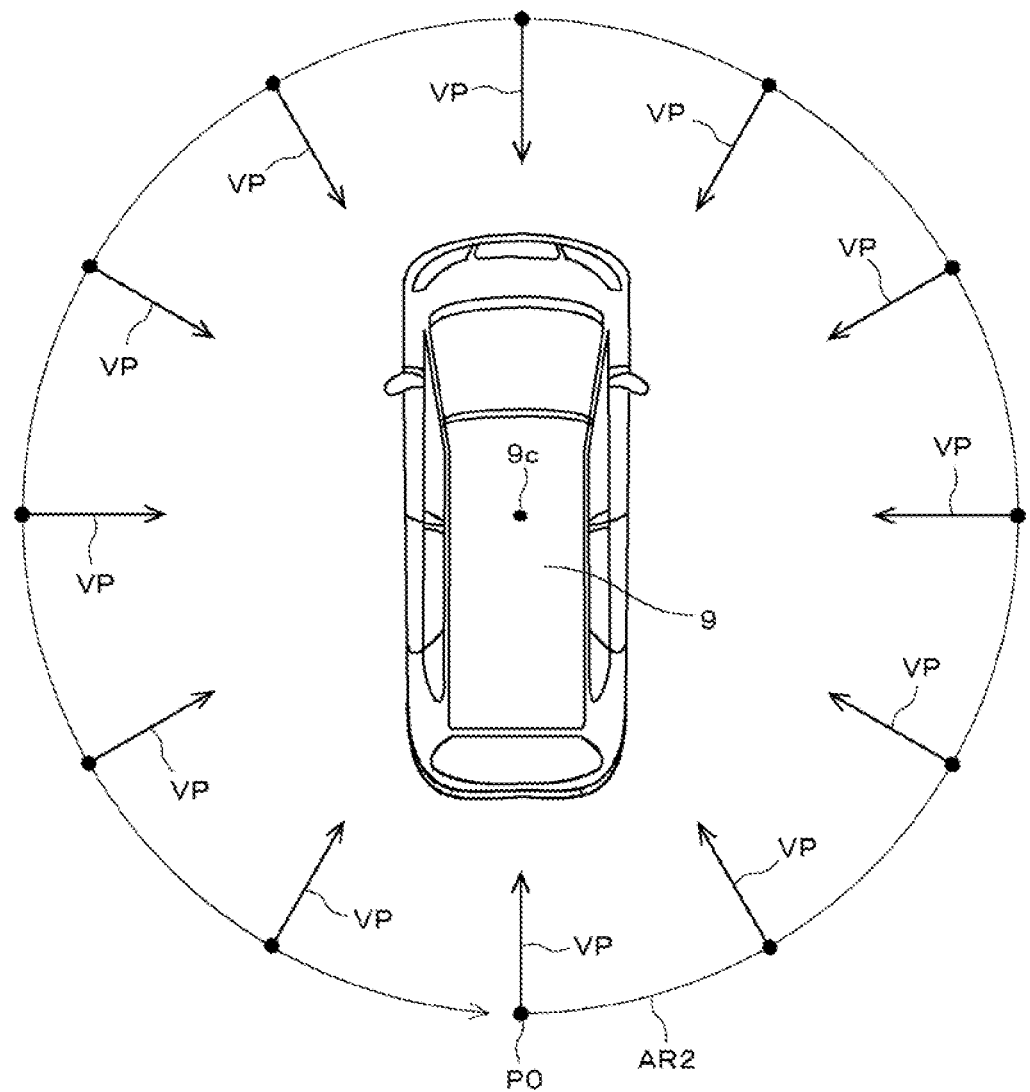
FIG. 9 illustrates an example of change of a virtual viewpoint in the rotation mode in the first embodiment.
Figure 10:
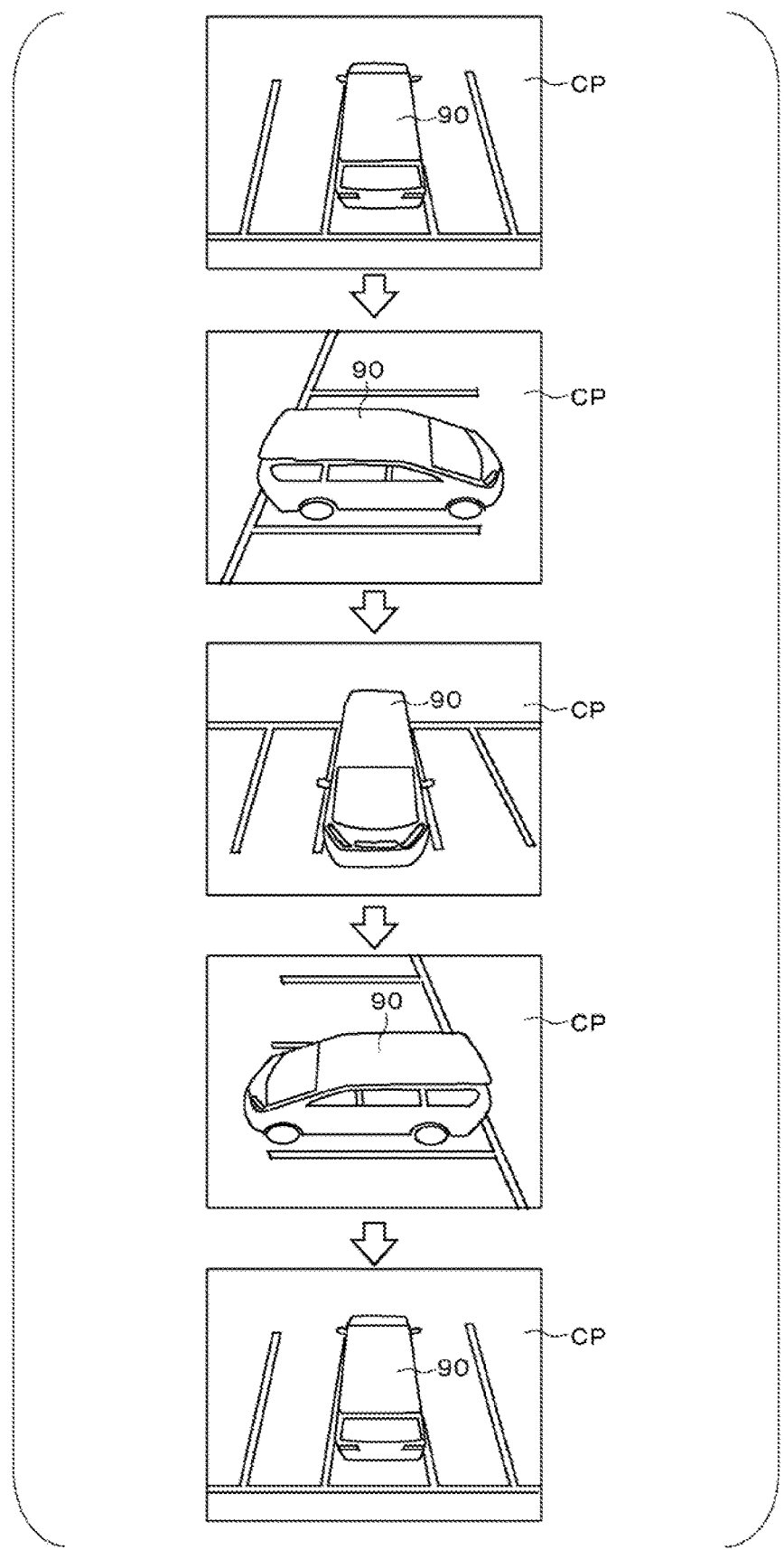
FIG. 10 illustrates examples of virtual viewpoint images generated in the rotation mode.

On the other hand, as shown in FIG. 9, when the virtual viewpoint VP is changed, the rotating image, is shown to the user in an order of the region behind the vehicle 9, the regions on the right side of the vehicle 9, the region in front of the vehicle 9, the regions on the left side of the vehicle 9 and then the region behind the vehicle 9, as shown in FIG. 10. Hereinafter, changing the virtual viewpoint VP as shown in FIG. 9 is referred to as "to set the rotation direction of the rotating image to a counterclockwise direction." In a case where the rotating image is set to the "counterclockwise" direction, the regions on the right side of the vicinity of the vehicle 9 are shown to the user prior to the regions on the left side of the vicinity of the vehicle 9.

The direction determiner 20d determines such a rotation direction of the rotating image. The direction determiner 20d determines the rotation direction of the rotating image based on the position of the object detected by the object detector 7. Thus, the user can immediately see the object existing in the vicinity of the vehicle 9.

The rotation direction of the rotating image is defined by a moving direction of the position of the virtual viewpoint VP (changing direction of the sight line of the virtual viewpoint VP). Therefore, determining the rotation direction of the rotating image by the direction determiner 20d is substantially equivalent to determining the moving direction of the position of the virtual viewpoint VP (changing direction of the sight line of the virtual viewpoint VP).

1-5. Operation Flow

Figure 11:
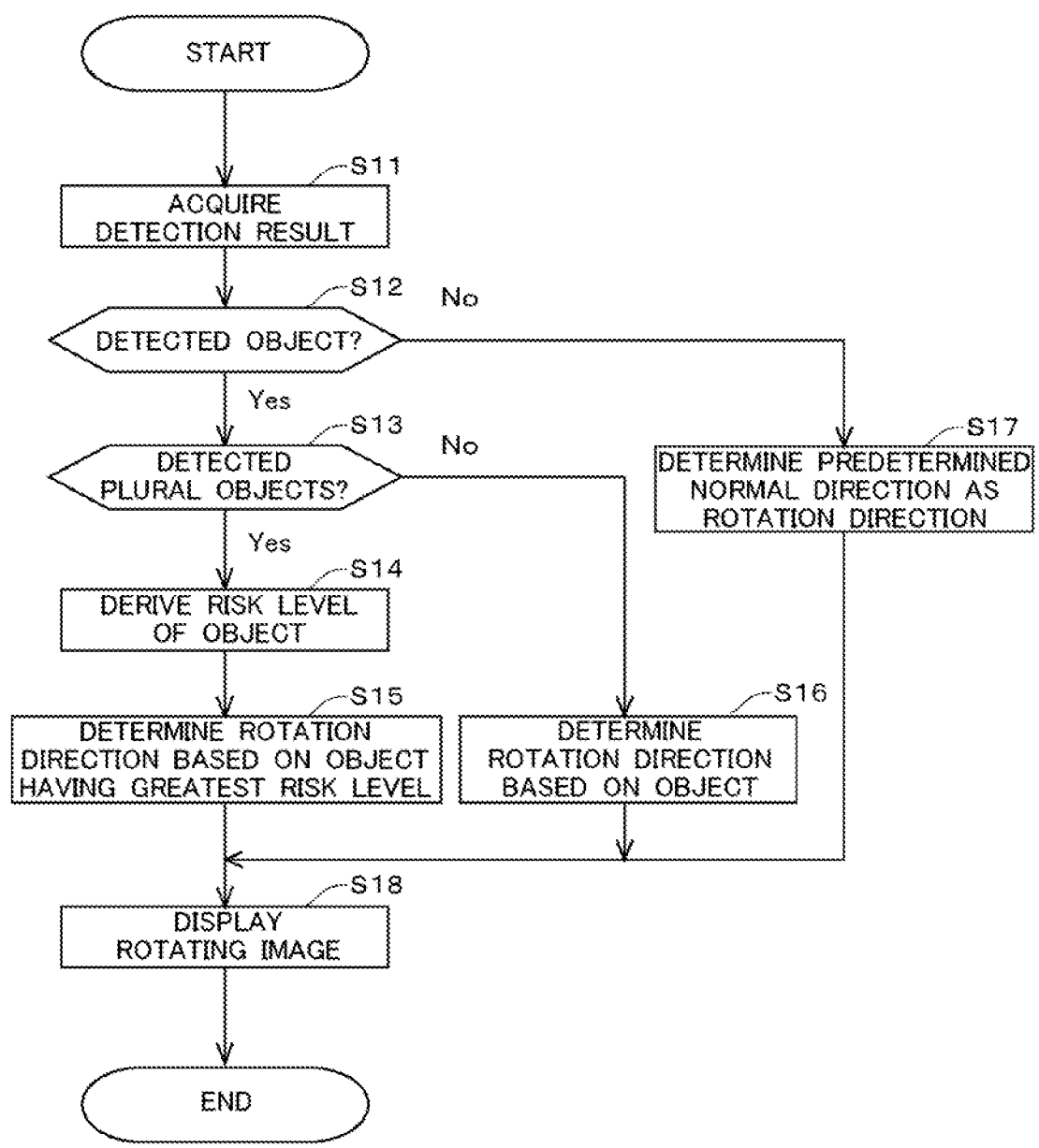
FIG. 11 illustrates a flow of an operation of an image generation apparatus.

Next described is a flow of operation of the image generation apparatus 2 in the rotation mode M2. FIG. 11 illustrates the flow of the operation of the image generation apparatus 2 in the rotation mode M2.

First, the result acquisition part 20b acquires the detection result from the object detector 7 (a step S11). The result acquisition part 20b acquires the detection result from the object detector 7, based on the signal received by the signal receiver 26 from the object detector 7.

Next, the direction determiner 20d determines, based on the detection result acquired by the result acquisition part 20b, whether or not the object detector 7 has detected an object (a step S12).

In a case where the object detector 7 has not detected an object (No in the step S12), the direction determiner 20d determines a predetermined normal direction as the rotation direction of the rotating image (a step S17).

Next, while the viewpoint controller 20a temporally continuously changes the virtual viewpoint VP, the image generator 22 temporally continuously generates the plurality of the virtual viewpoint image CP and thus the image generation apparatus 2 causes the rotating image to be displayed on the display 3 (a step S18). Before the rotating image is displayed, the viewpoint controller 20a changes the virtual viewpoint VP based on the rotation direction (i.e. normal direction) determined by the direction determiner 20d in the step S17. As a result, one of the right side and the left side of the vehicle 9, depending on the normal direction, is shown prior to the other, to the user.

It is recommended that the normal direction should be determined by a position of a driver's seat of the vehicle 9. For example, in a case where the vehicle 9 has the steering wheel on a right side, it is difficult for the driver to see a region on the left side of the vehicle 9, a side opposite to the driver's seat. Therefore, in the case where the vehicle 9 has the steering wheel on the right side, it is recommended that a clockwise direction should be determined as the normal direction to show the left side prior to the right side of the vehicle 9, to the user (refer to FIG. 7).

On the other hand, in a case where the object detector 7 has detected an object (Yes in the step S12), the direction determiner 20d determines whether or not the object detector 7 has detected plural objects (a step S13).

In a case where the object detector 7 has detected only one object (No in the step S13), the direction determiner 20d determines the rotation direction of the rotating image based on a position of the object included in the detection result from the object detector 7 (a step S16).

Next, the image generation apparatus 2 causes the rotating image to be displayed on the display 3 (the step S18). Before the rotating image is displayed, the viewpoint controller 20a changes the virtual viewpoint VP based on the rotation direction determined by the direction determiner 20d in the step S16. Thus, one of the left side and the right side of the vehicle 9 on which the object exists is shown prior to the other.

In a case where the object exists on the left side of the vehicle 9, the direction determiner 20d determines the "clockwise" direction as the rotation direction of the rotating image (refer to FIG. 7). Thus, the left side of the vehicle 9 on which the object exists is shown to the user before the right side in the rotating image. On the other hand, in a case where the object exists on the right side of the vehicle 9, the direction determiner 20d determines the "counterclockwise" direction as the rotation direction of the rotating image (refer to FIG. 9). Thus, the right side of the vehicle 9 on which the object exists is shown to the user before the left side in the rotating image.

As described above, the direction determiner 20d determines the rotation direction of the rotating image based on the position of the object detected by the object detector 7. Therefore, when watching the rotating image, the user can immediately see the object existing in the vicinity of the vehicle 9.

In a case where it is difficult to determine whether the object exists on the left side or the right side of the vehicle 9 because, for example, the object exists in a center in front of the vehicle 9 or behind the vehicle 9, the direction determiner 20d may determine the normal direction as the rotation direction of the rotating image.

Moreover, in a case where the object detector 7 detects plural objects (Yes in the step S13), the risk level deriving part 20c derives a risk level of each of the detected plural objects (a step S14). The risk level of an object is a parameter that shows a degree of possibility of the object to come into contact with the vehicle 9. As the risk level is bigger, the possibility of contact of the object with the vehicle 9 is higher. The risk level deriving part 20c derives the risk level of each of the plural objects based on the position of each of the plural objects (details will be described later).

Next, the direction determiner 20d selects one object having a greatest risk level amongst from the detected plural objects, and determines the rotation direction of the rotating image based on the position of the selected object (a step S15).

Next, the image generation apparatus 2 causes the rotating image to be displayed on the display 3 (the step S18). Before the rotating image is displayed, the viewpoint controller 20a changes the virtual viewpoint VP based on the rotation direction determined by the direction determiner 20d in the step S15. Thus, one of the left side and the right side of the vehicle 9 on which the object having the greatest risk level exists is shown prior to the other. In other words, the object having a biggest possibility of contact with the vehicle 9 exists is preferentially shown prior to the other objects.

In a case where the object having the greatest risk level exists in a region on the left side of the vehicle 9, the direction determiner 20d determines the "clockwise" direction as the rotation direction of the rotating image (refer to FIG. 7). Thus, in the rotating image, the left side of the vehicle 9 on which the object having the greatest risk level exists is shown to the user prior to the right side. On the other hand, in a case where the object having the greatest risk level exists in a region on the right side of the vehicle 9, the direction determiner 20d determines the "counterclockwise" direction as the rotation direction of the rotating image (refer to FIG. 9). Thus, in the rotating image, the right side of the vehicle 9 on which the object having the greatest risk level exists is shown prior to the left direction to the user.

As described above, the direction determiner 20d determines the rotation direction of the rotating image based on the position of the object having the greatest risk level among the plural objects detected by the object detector 7. Therefore, when watching the rotating image, the user can immediately see the object having the greatest risk level of contact with the vehicle 9.

1-6. Risk Level

Next described is the risk level of each object derived by the risk level deriving part 20c in the case where the object detector 7 detects plural objects. The risk level deriving part 20c derives a prediction path in which the vehicle 9 is expected to run, and derives the risk level based on the prediction path.

The prediction path is a region in which the vehicle 9 is expected to go through in a case where the vehicle 9 runs for a predetermine time period (e.g., 3 seconds) in creeping phenomenon. The risk level deriving part 20c derives the prediction path based on the shift position and the steering wheel angle of the vehicle 9 acquired by the signal receiver 26.

Figure 12:
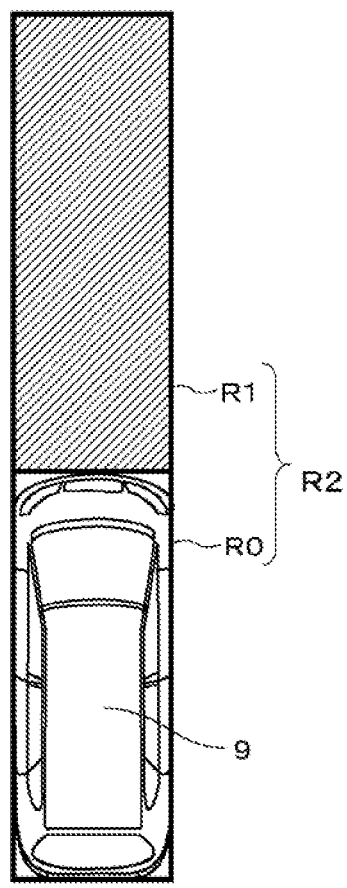
FIG. 12 illustrates an example of a prediction path.
Figure 13:
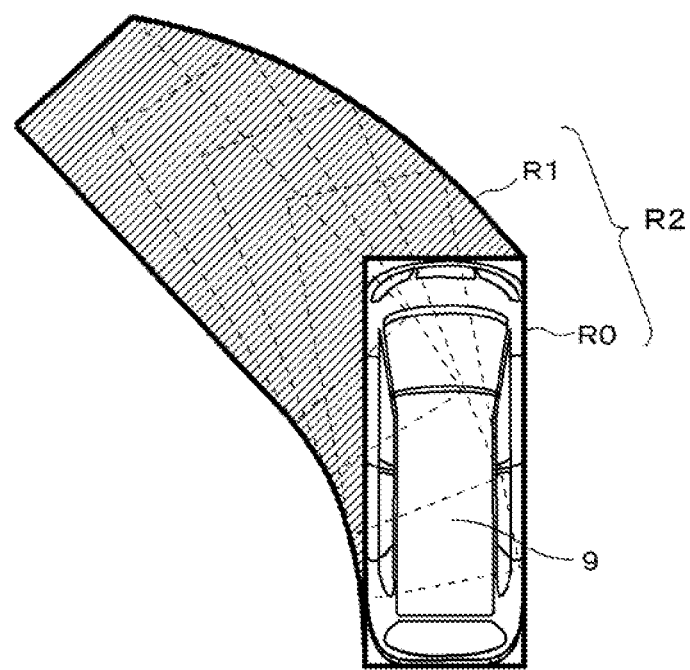
FIG. 13 illustrates an example of a prediction path.

For example, in a case where the shift position is in drive and the steering wheel is in a neutral position, the risk level deriving part 20c derives a prediction path R1 straightly extending in front of the vehicle 9, as shown in FIG. 12. Moreover, for example, in a case where the shift position is in drive and the steering wheel is turned left from the neutral position, the risk level deriving part 20c derives the prediction path R1 extending leftward and left-forward of the vehicle 9, as shown in FIG. 13. Moreover, for example, in a case where the shift position is in reverse and the steering wheel is turned left from the neutral position, the risk level deriving part 20c derives the prediction path R1 extending rightward and left-backward of the vehicle 9, as shown in FIG. 14.

Such a relation between the shift position and the prediction path R1 is derived beforehand and is stored in the memory 27 as a part of the vehicle data 27b. Therefore, the risk level deriving part 20c derives the prediction path R1 based on the shift position and the steering wheel angle of the vehicle 9, using the vehicle data 27b.

Once deriving the prediction path R1, the risk level deriving part 20c derives the risk level of each of the plural objects based on the prediction path R1 and the position of each of the plural objects detected by the object detector 7.

Figure 14:
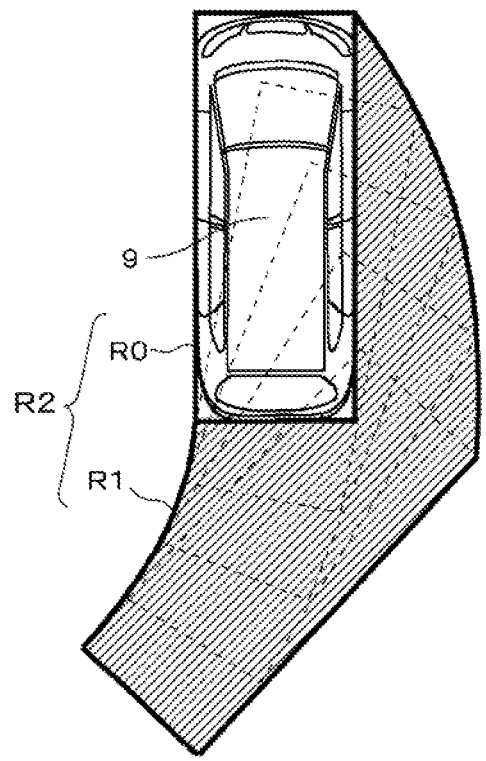
FIG. 14 illustrates an example of a prediction path.

The risk level deriving part 20c sets, as shown in FIGS. 12 to 14, a determination region R2 that includes the prediction path R1 and a vehicle region R0 in which the vehicle 9 is currently located. Then, the risk level deriving part 20c derives the risk level of each object based on a distance from the position of the object to the determination region R2. The risk level deriving part 20c derives a greater risk level as the distance from the position of the object to the determination region R2 is smaller.

FIGS. 15 to 18 illustrate examples of derivation of the risk level. In the examples in those drawings, objects OL and OR exist both on the left side and the right side of the vehicle 9.

Figure 15:
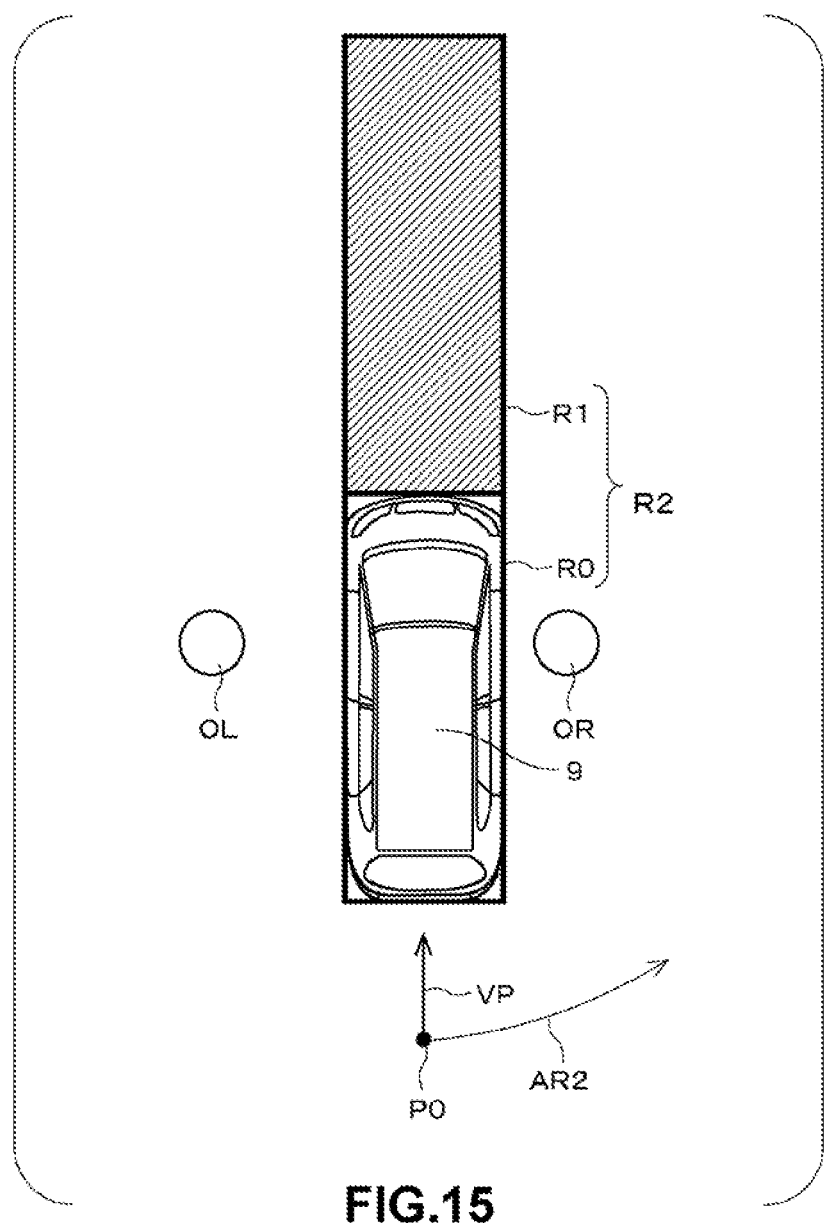
FIG. 15 illustrates an example of derivation of a risk level.

FIG. 15 illustrates a case where the shift position of the vehicle 9 is in drive and the steering wheel of the vehicle 9 is in the neutral position. In the case shown in FIG. 15, a distance to the determination region R2 from the object OR on the right side is smaller than a distance to the determination region R2 from the object OL on the left side. Therefore, the risk level deriving part 20c derives a greater risk level for the right object OR as compared to the left object OL.

Therefore, in the case shown in FIG. 15, the direction determiner 20d determines the "counterclockwise" direction as the rotation direction of the rotating image to show sooner the right object OR having a greater risk level, to the user in the displayed rotating image (the arrow AR2).

Figure 16:
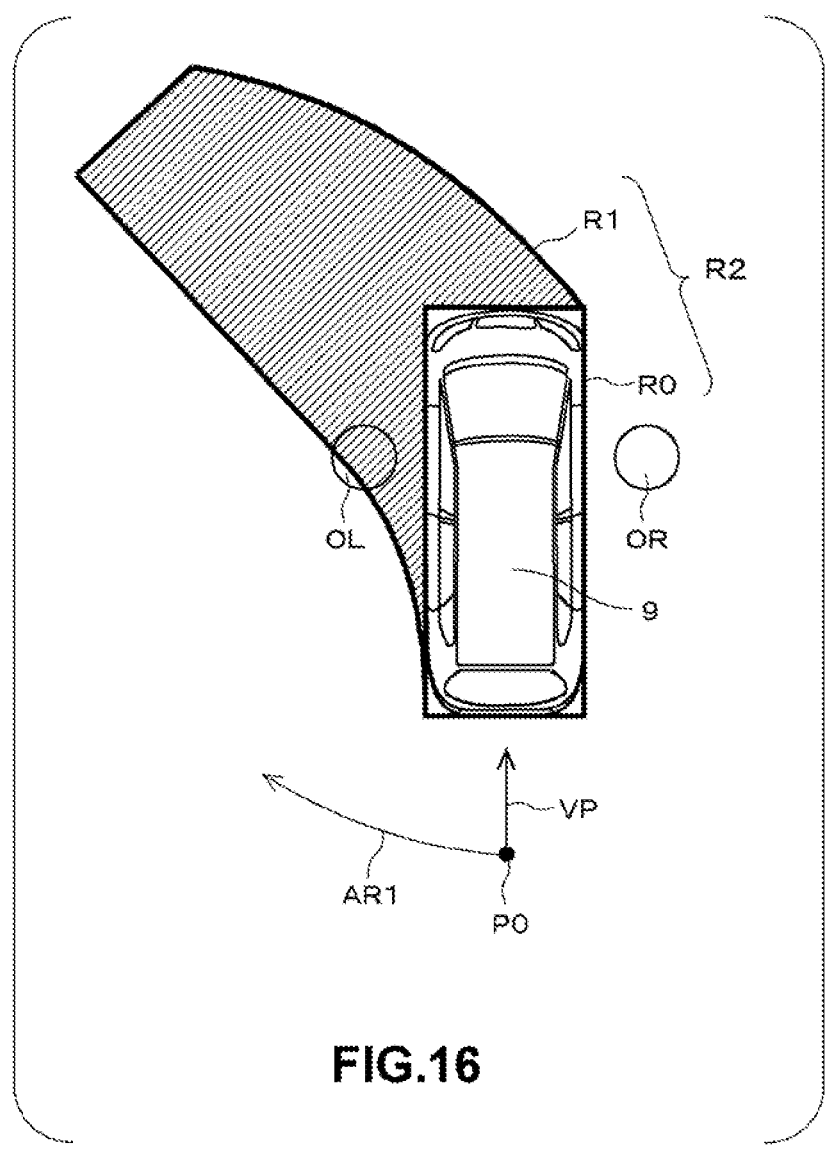
FIG. 16 illustrates an example of derivation of a risk level.

Moreover, FIG. 16 illustrates a case where the shift position of the vehicle 9 is in drive and the steering wheel of the vehicle 9 is turned left from the neutral position. In the case shown in FIG. 16, a distance to the vehicle region R0 from the object OR on the right side is the same as a distance to the vehicle region R0 from the object OL on the left side. However, the left object OL is included in the prediction path R1 and a distance to the determination region R2 from the left object OL is smaller as compared to the right object OR. Therefore, the risk level deriving part 20c derives a greater risk level for the left object OL as compared to the right object OR.

Therefore, in the case shown in FIG. 16, the direction determiner 20d determines the "clockwise" direction as the rotation direction of the rotating image to show sooner the left object OL having a greater risk level, to the user in the displayed rotating image (the arrow AR1).

Figure 17:
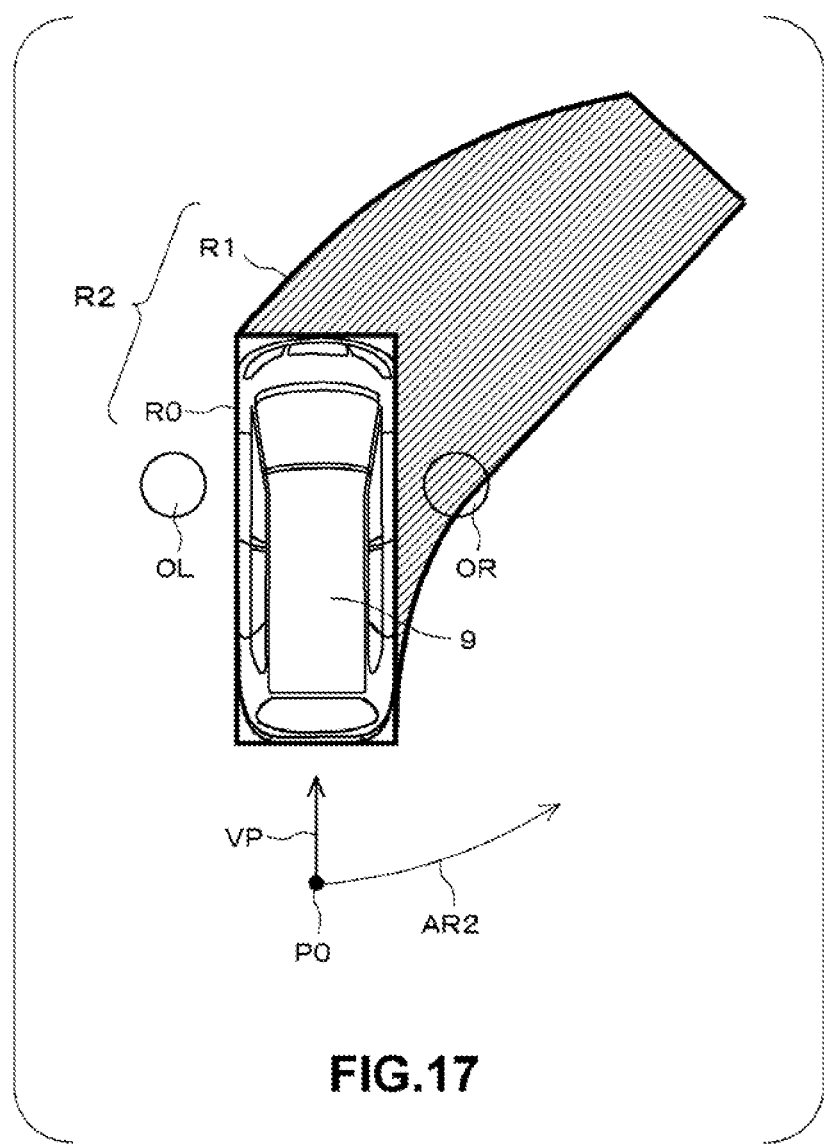
FIG. 17 illustrates an example of derivation of a risk level.

Moreover, FIG. 17 illustrates a case where the shift position of the vehicle 9 is in drive and the steering wheel of the vehicle 9 is turned right from the neutral position. In the case shown in FIG. 17, a distance to the vehicle region R0 from the object OR on the right side is the same as a distance to the vehicle region R0 from the object OL on the left side. However, the right object OR is included in the prediction path R1 and a distance to the determination region R2 from the right object OR is smaller as compared to the left object OL. Therefore, the risk level deriving part 20c derives a greater risk level for the right object OR as compared to the left object OL.

Therefore, in the case shown in FIG. 17, the direction determiner 20d determines the "counterclockwise" direction as the rotation direction of the rotating image to show sooner the right object OR having a greater risk level, to the user in the displayed rotating image (the arrow AR2).

Figure 18:
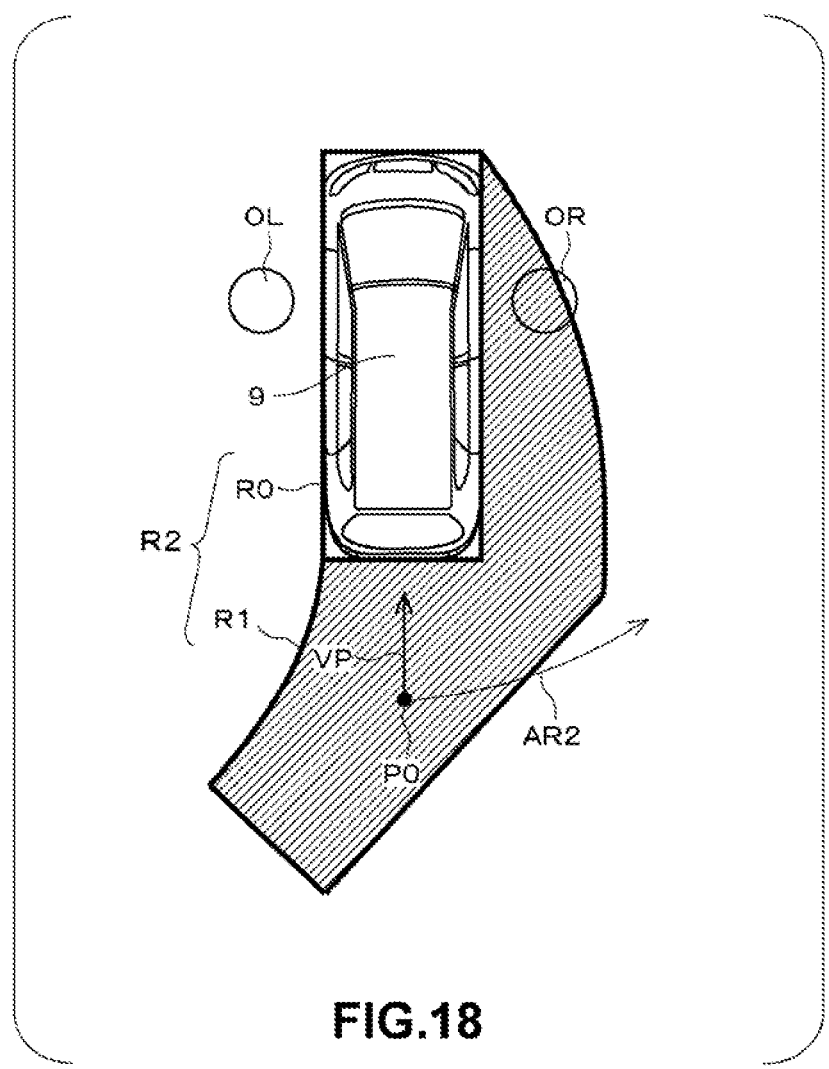
FIG. 18 illustrates an example of derivation of a risk level.

Moreover, FIG. 18 illustrates a case where the shift position of the vehicle 9 is in reverse and the steering wheel of the vehicle 9 is turned left from the neutral position. In the case shown in FIG. 18, a distance to the vehicle region R0 from the object OL on the left side is the same as a distance to the vehicle region R0 from the object OR on the right side. However, the right object OR is included in the prediction path R1 and a distance to the determination region R2 from the right object OR is smaller as compared to the left object OL. Therefore, the risk level deriving part 20c derives a greater risk level for the right object OR as compared to the left object OL.

Therefore, in the case shown in FIG. 18, the direction determiner 20d determines the "counterclockwise" direction as the rotation direction of the rotating image to show sooner the right object OR having a greater risk level, to the user in the displayed rotating image (the arrow AR2).

As described above, the image generator 22 of the image generation apparatus 2 in this embodiment temporally continuously generates the plurality of the virtual viewpoint images CP showing the vicinity of the vehicle 9 viewed from the virtual viewpoint VP, using the plurality of captured images acquired by the plurality of cameras. The viewpoint controller 20a temporally continuously changes the virtual viewpoint VP so that the plurality of the virtual viewpoint images CP go around the vicinity of the vehicle 9 and thus the rotating image shows the vicinity of the vehicle 9. Moreover, the result acquisition part 20b acquires the detection result from the object detector 7 that detects an object existing in the vicinity of the vehicle 9, and the direction determiner 20d determines the rotation direction of the rotating image based on the position of the object detected by the object detector 7. Therefore, the user can immediately see the object existing in the vicinity of the vehicle 9.

In addition, in the case where the object detector 7 has detected plural objects, the risk level deriving part 20c derives the risk level of each of the plural objects that shows a degree of possibility of the object to come into contact the vehicle 9. Then, the direction determiner 20d determines the rotation direction of the rotating image based on the position of the object having a greatest risk level among the plural objects. Therefore, the user can immediately see the object having the greatest risk level.

Moreover, the risk level deriving part 20c derives the risk level of each of the plural objects based on the position of each of the plural objects and the prediction path R1 in which the vehicle 9 is expected to run. Therefore, the risk level deriving part 20c can appropriately derive the risk level of each of the plural objects.

2. Second Embodiment

Next, a second embodiment is described. A configuration and an operation of an image generation apparatus 2 in the second embodiment are substantially same as the configuration and the operation of the image generation apparatus 2 in the first embodiment. Therefore, differences from the first embodiment are hereinafter mainly described.

In the first embodiment, a rotation speed of the rotating image is constant. However, in the second embodiment, in a case where no object exists in a vicinity of a vehicle 9, a rotation speed of a rotating image is constant, but in a case where an object exists in the vicinity of the vehicle 9, the rotation speed of the rotating image is changed based on a position of the object.

Figure 19:
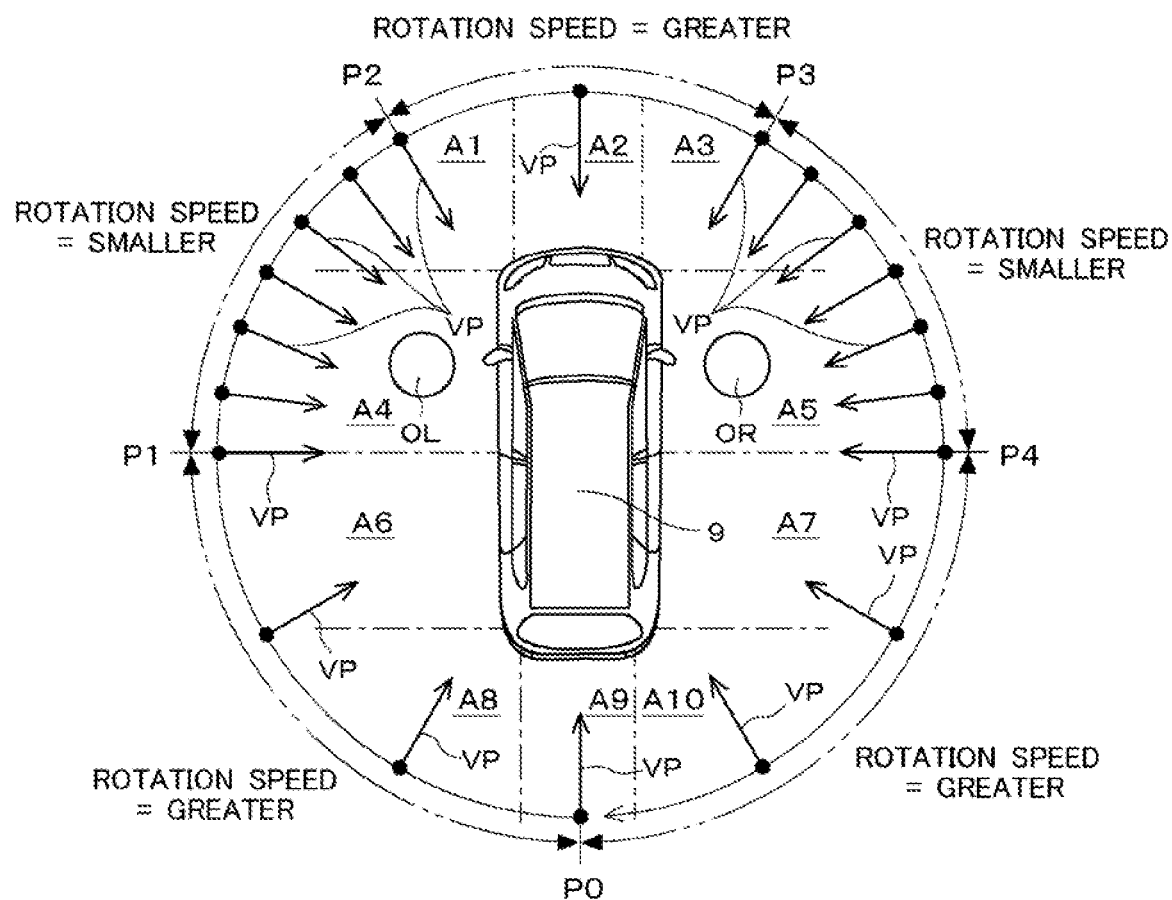
FIG. 19 illustrates an example of change of a virtual viewpoint in a rotation mode in a second embodiment.

FIG. 19 illustrates an example of change of a virtual viewpoint VP in a rotation mode M2 in the second embodiment. In the example shown in FIG. 19, an object OL exists in a divided region A4 on a left side of the vehicle 9 and an object OR exists in a divided region A5 on a right side of the vehicle 9.

In this case, too, a viewpoint controller 20a first sets the virtual viewpoint VP having a sight line directed toward a center of the vehicle 9 to an initial position P0 that is a position above and behind the vehicle 9. Then, the viewpoint controller 20a temporally continuously changes the position and a direction of the sight line of the virtual viewpoint VP based on a rotation direction determined by a direction determiner 20d. In the example shown in FIG. 19, the rotation direction of the rotating image is a "clockwise" direction. As described above, the rotation speed of the rotating image is defined by a moving speed (changing speed of the direction of the sight line of the virtual viewpoint VP) of a position of the virtual viewpoint VP changed by the viewpoint controller 20a.

In a case where the sight line of the virtual viewpoint VP is directed toward the object, the viewpoint controller 20a causes the rotation speed of the rotating image to be slower than a normal rotation speed. On the other hand, in a case where the sight line of the virtual viewpoint VP is directed toward a region not including of the object in the vicinity of the vehicle 9, the viewpoint controller 20a causes the rotation speed of the rotating image to be faster than the normal rotation speed. The normal rotation speed is a rotation speed of the rotating image for the case where no object exists in the vicinity of the vehicle 9.

In this embodiment, when the sight line of the virtual viewpoint VP is going through a divided region in which an object exists, the viewpoint controller 20a determines that the sight line of the virtual viewpoint VP is directed toward the object. On the other hand, when the sight line of the virtual viewpoint VP is not going through the divided region in which an object exists, the viewpoint controller 20a determines that the sight line of the virtual viewpoint VP is directed toward the region not including the object.

In the example shown in FIG. 19, in a time period in which the position of the virtual viewpoint VP is moved from the initial position P0 to a position P1, the sight line of the virtual viewpoint VP is directed toward the region not including the object. Therefore, the viewpoint controller 20a causes the rotation speed of the rotating image to be faster than the normal rotation speed.

Moreover, in a time period in which the position of the virtual viewpoint VP is moved from the position P1 to a position P2, the sight line of the virtual viewpoint VP goes through the divided region A4 in which the left object OL exists. Therefore, the viewpoint controller 20a determines that the sight line of the virtual viewpoint VP is directed toward the left object OL, and causes the rotation speed of the rotating image to be slower than the normal rotation speed.

In a time period in which the position of the virtual viewpoint VP is moved from the position P2 to a position P3, the sight line of the virtual viewpoint VP is directed toward a region not including the object. Therefore, the viewpoint controller 20a causes the rotation speed of the rotating image to be faster than the normal rotation speed.

Moreover, in a time period in which the position of the virtual viewpoint VP is moved from the position P3 to a position P4, the sight line of the virtual viewpoint VP is going through a divided region A5 in which the right object OR exists. Therefore, the viewpoint controller 20a determines that the sight line of the virtual viewpoint VP is directed toward the right object OR, and causes the rotation speed of the rotating image to be slower than the normal rotation speed.

In a time period in which the position of the virtual viewpoint VP is moved from the position P4 to the initial position P0, the sight line of the virtual viewpoint VP is directed toward a region not including the object. Therefore, the viewpoint controller 20a causes the rotation speed of the rotating image to be faster than the normal rotation speed.

As described above, in a case where the sight line of the virtual viewpoint VP is directed toward an object, the rotation speed is caused to be slower than the normal rotation speed. Therefore, the user can see the object in the rotating image, in detail.

For example, in a case where the rotation speed is same as the normal rotation speed, instead of being faster than the normal rotation speed, even when the sight line of the virtual viewpoint VP is directed toward a region not including an object, since the rotation speed is caused to be slower than the normal rotation speed when the sight line of the virtual viewpoint VP is directed toward the object, it takes more time to show the rotating image as compared to the case where no object exists in the vicinity of the vehicle 9.

On the other hand, in the second embodiment, in the case where the sight line of the virtual viewpoint VP is directed toward a region not including the object, the rotation speed is caused to be faster than the normal rotation speed. Therefore, it can be prevented that a time period necessary to show the rotating image becomes longer. Thus, in addition to seeing the object easily, it can be prevented that a time period necessary to show the rotating image becomes longer. It is recommended that the time period necessary to show the rotating image in a case where no object exists in the vicinity of the vehicle 9 should be the same as a case where at least one object exists in the vicinity of the vehicle 9.

3. Third Embodiment

Next, a third embodiment is described. A configuration and an operation of an image generation apparatus 2 in the third embodiment are substantially same as the configuration and the operation of the image generation apparatus 2 in the second embodiment. Therefore, differences from the second embodiment are hereinafter mainly described.

In the second embodiment, the viewpoint controller 20a changes the sight line of the virtual viewpoint VP so as to cause the rotation speed to be faster than the normal rotation speed in the case where the sight line of the virtual viewpoint VP is directed toward a region not including an object. However, in the third embodiment, a viewpoint controller 20a changes a virtual viewpoint VP so as to direct a sight line of the virtual viewpoint VP only toward an object by skipping regions not including an object in a vicinity of a vehicle 9.

Figure 20:
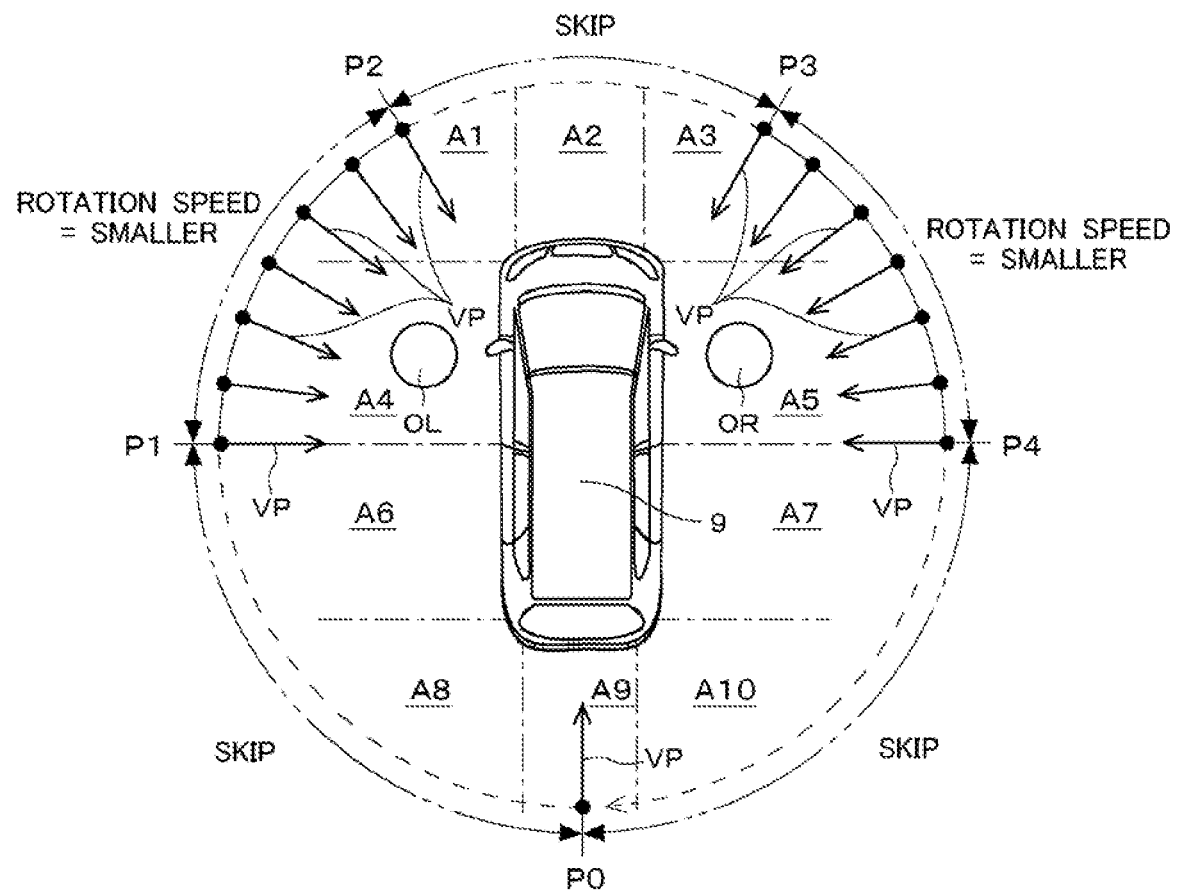
FIG. 20 illustrates an example of change of a virtual viewpoint in a rotation mode in a third embodiment.

FIG. 20 illustrates an example of change of the virtual viewpoint VP in a rotation mode M2 in the third embodiment. In the example shown in FIG. 20, an object OL exists in a divided region A4 on a left side of the vehicle 9, and an object OR exists in a divided region A5 on a right side of the vehicle 9.

In this case, too, the viewpoint controller 20a first sets the virtual viewpoint VP having the sight line directed toward a center of the vehicle 9 to an initial position P0 that is a position above and behind the vehicle 9. Then, the viewpoint controller 20a changes a position and a direction of the sight line of the virtual viewpoint VP based on a rotation direction determined by a direction determiner 20d. In the example shown in FIG. 20, the rotation direction of a rotating image is a "clockwise" direction. However, the viewpoint controller 20a skips a region not including an object in the vicinity of the vehicle 9 and does not direct the sight line of the virtual viewpoint VP toward the region not including the object.

When the position of the virtual viewpoint VP is in a range from the initial position P0 to a position P1, the sight line of the virtual viewpoint VP is not directed toward any object. Therefore, the viewpoint controller 20a does not temporally continuously change the position of the virtual viewpoint VP but skips the range from the initial position P0 to the position P1. In other words, the viewpoint controller 20a instantaneously moves the position of the virtual viewpoint VP from the initial position P0 to the position P1.

When the position of the virtual viewpoint VP is in a range from the position P1 to a position P2, the sight line of the virtual viewpoint VP is directed toward the object OL on the left side. Therefore, the viewpoint controller 20a temporally continuously changes the position of the virtual viewpoint VP from the position P1 to the position P2. In this case, it is recommended that the viewpoint controller 20a should cause the rotation speed of the rotating image to be slower than the normal rotation speed such that the user can see the object OL in detail.

When the position of the virtual viewpoint VP is in a range from the position P2 to a position P3, the sight line of the virtual viewpoint VP is not directed toward any object. Therefore, the viewpoint controller 20a does not temporally continuously change the position of the virtual viewpoint VP but skips the range from the position P2 to the position P3. In other words, the viewpoint controller 20a instantaneously moves the position of the virtual viewpoint VP from the position P2 to the position P3.

When the position of the virtual viewpoint VP is in a range from the position P3 to a position P4, the sight line of the virtual viewpoint VP is directed toward the object OR on the right side. Therefore, the viewpoint controller 20a temporally continuously changes the position of the virtual viewpoint VP from the position P3 to the position P4. In this case, it is recommended that the viewpoint controller 20a should cause the rotation speed of the rotating image to be slower than the normal rotation speed such that the user can see the object OR in detail.

When the position of the virtual viewpoint VP is in a range from the position P4 to the initial position P0, the sight line of the virtual viewpoint VP is not directed toward any object. Therefore, the viewpoint controller 20a does not temporally continuously change the position of the virtual viewpoint VP but skips the range from the position P4 to the initial position P0. In other words, the viewpoint controller 20a instantaneously moves the position of the virtual viewpoint VP from the position P4 to the initial position P0.

As described above, in the third embodiment, the viewpoint controller 20a changes the virtual viewpoint VP so as to direct the sight line of the virtual viewpoint VP only toward an object while skipping regions not including an object in the vicinity of the vehicle 9. Thus, necessary time to show the rotating image can be reduced.

4. Modifications

The embodiments of the invention are described above. However, the invention is not limited to the foregoing embodiments, but various modifications are possible. Such a modification is described below. Any form in the foregoing embodiments and the modifications described below may be arbitrarily combined with one another.

Figure 21:
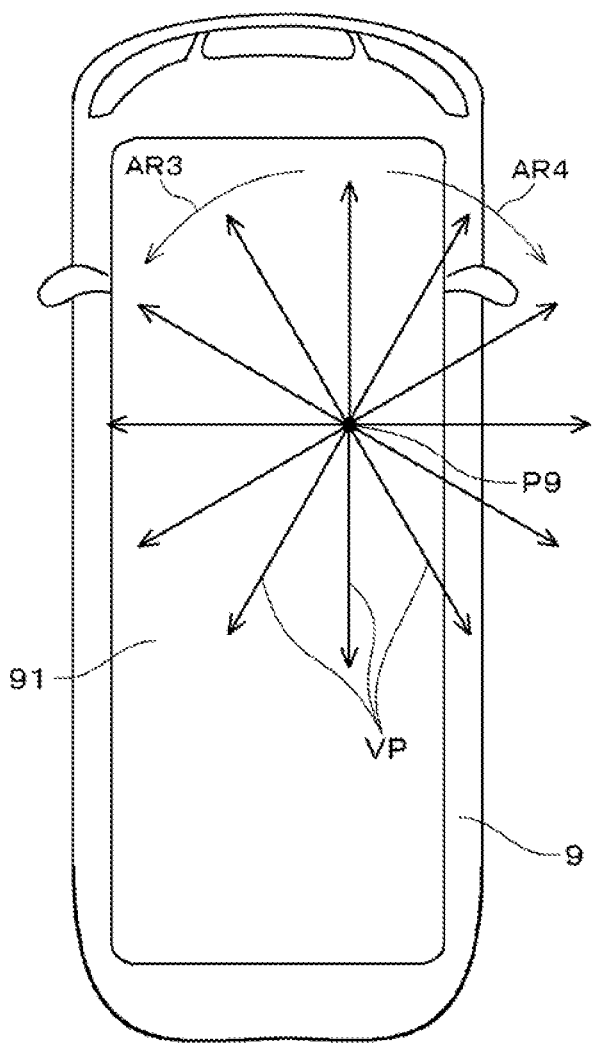
FIG. 21 illustrates another example of change of a virtual viewpoint in the rotation mode.

In the foregoing embodiments, the position of the virtual viewpoint VP is set outside the vehicle 9 and the viewpoint controller 20a temporally continuously changes the position of the virtual viewpoint VP so that the rotating image is displayed in such a way as to go around the vicinity of the vehicle 9. However, a position of a virtual viewpoint VP may be set inside a cabin 91 of the vehicle 9, as shown in FIG. 21, and the rotating image may be displayed by a viewpoint controller 20a temporally continuously changing a direction of a sight line of the virtual viewpoint VP. In this case, too, the sight line (a region shown in a center of the virtual viewpoint image CP) of the virtual viewpoint VP goes around the vicinity of the vehicle 9.

Figure 22:
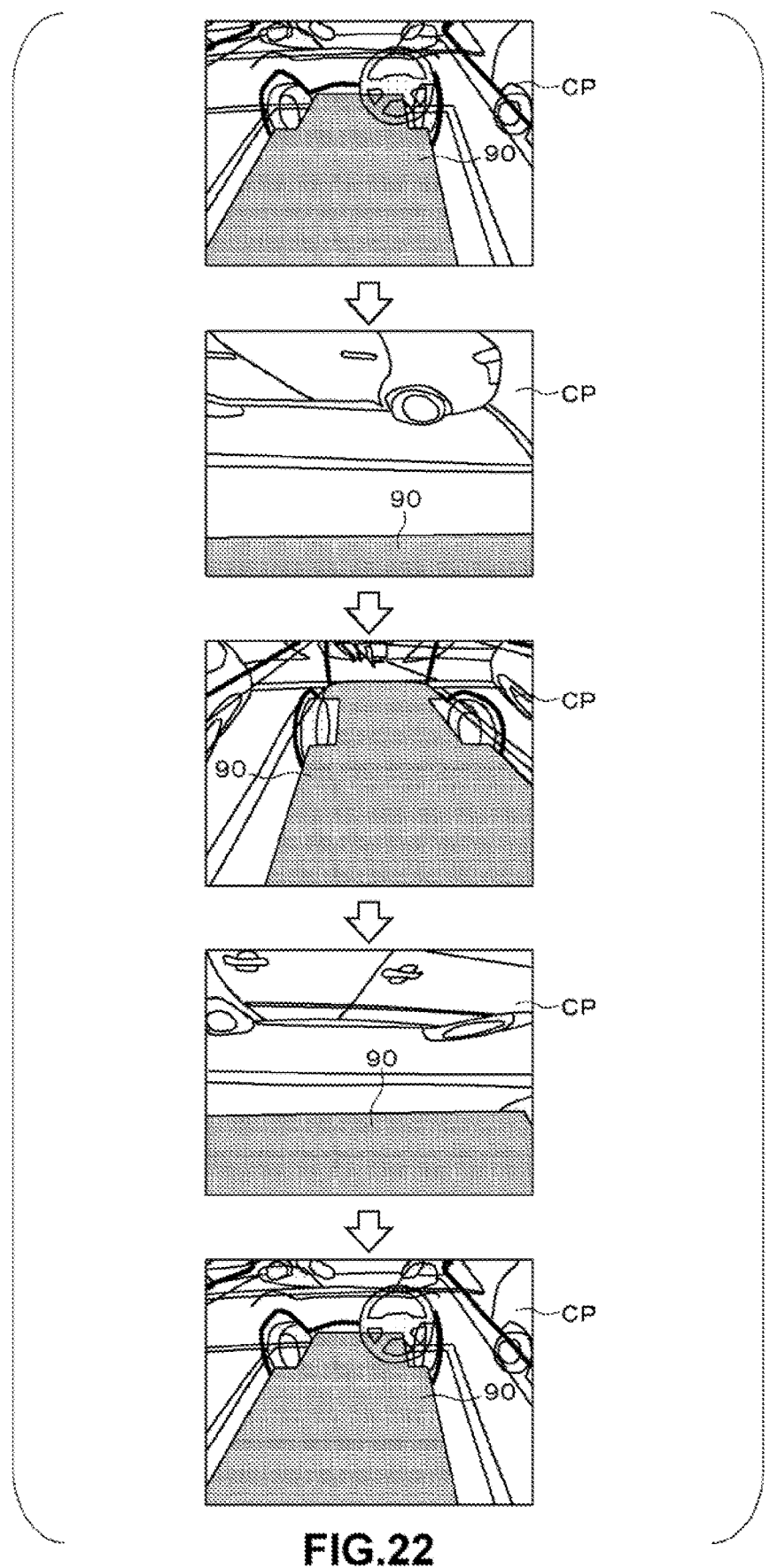
FIG. 22 illustrates other examples of virtual viewpoint images generated in the rotation mode.

In this case, for example, if the virtual viewpoint VP is set to a position P9 of a driver's seat, a plurality of virtual viewpoint images CP viewed from a viewpoint of a driver can be generated, as shown in FIG. 22. The plurality of virtual viewpoint images CP are temporally continuously displayed on a display 3 as the rotating image showing the vicinity of the vehicle 9 in such a way as to go around the vicinity of the vehicle 9. In this case, too, a direction determiner 20d determines the rotation direction of the rotating image based on a position of an object detected by an object detector 7. As shown in FIG. 21, the rotation direction of the rotating image is defined by a change direction (arrows AR3 and AR4) changed by the viewpoint controller 20a to change the sight line of the virtual viewpoint VP.

Moreover, in the case where the position of the virtual viewpoint VP is set in the cabin 91 of the vehicle 9, as described above, the position of the virtual viewpoint VP may be changed based on a direction of the sight line of the virtual viewpoint VP. For example, in a case where the sight line of the virtual viewpoint VP is directed toward a back side of the vehicle 9, the position of the virtual viewpoint VP may be moved to the back side of the cabin 91 of the vehicle 9.

Moreover, in the foregoing embodiments, when deriving the prediction path R1, the risk level deriving part 20c determines whether leftward or rightward the vehicle 9 is moving, based on the steering wheel angle. However, instead of the steering wheel angle or in addition to the steering wheel angle, a risk level deriving part 20c may determines whether leftward or rightward the vehicle 9 is moving based on a direction indicated by a blinker of the vehicle 9.

In the foregoing embodiments, the object detector 7 including the clearance sonar units 72 detects an object existing in the vicinity of the vehicle 9. However, for example, an object may be detected using a radar unit, an object recognition method based on captured images or another method.

In the foregoing embodiments, the initial position P0 of the virtual viewpoint VP is located above and behind the vehicle 9. However, an initial position P0 may be located at another position such as a position above and in front of the vehicle 9.

In the foregoing embodiments, the rotating image shows the vicinity of the vehicle 9 in such a way as to go around the vicinity of the vehicle once. However, the rotating image may go around less than once or more than once.

In the foregoing embodiments, the image display system 10 including the image generation apparatus 2 is described as an apparatus that is installed on the vehicle 9. However, the image display system 10 may be a smart phone or another portable computer that can be brought into and used in the vehicle.

In the foregoing embodiments, the function described as one block is not necessarily implemented by a single physical element, but may be implemented by separate physical elements. Further, in the foregoing embodiments, the function described as a plurality of blocks may be implemented by a single physical element. Further, a process relating to one arbitrary function may be shared and implemented by apparatuses inside and outside the vehicle, and the function may be implemented as a whole by exchanging information via communications between those apparatuses.

In the foregoing embodiments, the various functions are implemented by software by the CPU performing the arithmetic process in accordance with the program. However, a part of those functions may be implemented by an electric hardware circuit. Moreover, in the foregoing embodiments, a part of functions that are implemented by a hardware circuit may be implemented by software. Further, the function described as one block in the foregoing embodiment may be implemented by cooperation between software and hardware.

While the invention has been shown and described in detail, the foregoing description is in all aspects illustrative and not restrictive. It is therefore understood that numerous other modifications and variations can be devised without departing from the scope of the invention.

What is claimed is:

1. An image generation apparatus that is used in a vehicle, the image generation apparatus comprising:
   an image generator circuit that temporally continuously generates a plurality of virtual viewpoint images showing a vicinity of the vehicle viewed from a virtual viewpoint, using a plurality of captured images acquired by a plurality of cameras; and
   a microcomputer configured to control the image generator circuit to:
   (i) temporally continuously change a position of a center point of the virtual viewpoint around the vehicle so that each of the plurality of virtual viewpoint images is from a different virtual viewpoint around the vehicle and the plurality of virtual viewpoint images appear to be a moving image showing the vicinity of the vehicle in such a way as to go around the vicinity of the vehicle;

(ii) acquire a detection result from a detector that detects an object existing in the vicinity of the vehicle; and (iii) based on an object position of the object detected by the detector, determine a rotation direction of the center point of the virtual viewpoint around the vehicle to be either a clockwise direction or a counter-clockwise direction depending on which of the clockwise and counterclockwise directions causes the center point of the virtual viewpoint to approach the object position of the object detected by the detector in a quicker manner.

2. The image generation apparatus according to claim 1, wherein the microcomputer is further configured to derive a risk level of each of a plurality of objects in a case where the detector has detected the plurality of objects, the risk level being a degree of possibility of each of the plurality of objects to come into contact with the vehicle;

wherein the object position is a position of one object of the plurality of objects having a greatest risk level.

3. The image generation apparatus according to claim 2, wherein the microcomputer derives the risk level of each of the plurality of objects based on a position of each of the plurality of objects.

4. The image generation apparatus according to claim 3, wherein the microcomputer derives the risk level of each of the plurality of objects based on (1) a prediction path in which the vehicle is expected to run and (2) the position of each of the plurality of objects.

5. The image generation apparatus according to claim 1, wherein the microcomputer causes a rotation speed of the center point of the virtual viewpoint around the vehicle to be slower than a normal rotation speed in a case where a sight line of the virtual viewpoint is directed toward the object, and the microcomputer causes the rotation speed of the center point of the virtual viewpoint around the vehicle to be faster than the normal rotation speed in a case where the sight line of the virtual viewpoint is directed toward a region not including the object.

6. The image generation apparatus according to claim 1, wherein the microcomputer changes the position of the virtual viewpoint so as to direct a sight line of the virtual viewpoint only toward the object by skipping a region not including the object in the vicinity of the vehicle.

7. The image generation apparatus according to claim 1, further comprising:

a display that displays the moving image.

8. An image generation method that is used in a vehicle, the image generation method comprising the steps of:

(a) temporally continuously generating, by an image generator circuit, a plurality of virtual viewpoint images showing a vicinity of the vehicle viewed from a virtual viewpoint, using a plurality of captured images acquired by a plurality of cameras;

(b) temporally continuously changing, by a microcomputer that controls the image generator circuit, a position of a center point of the virtual viewpoint around the vehicle so that the plurality of virtual viewpoint images is from a different virtual viewpoint around the vehicle and the plurality of virtual viewpoint images appear to be a moving image showing the vicinity of the vehicle in such a way as to go around the vicinity of the vehicle;

(c) acquiring, by the microcomputer, a detection result from a detector that detects an object existing in the vicinity of the vehicle; and (d) based on an object position of the object detected by the detector, determining, by the microcomputer, a rotation direction of the center point of the virtual viewpoint around the vehicle to be either a clockwise direction or a counter-clockwise direction depending on which of the clockwise and counterclockwise directions causes the center point of the virtual viewpoint to approach the object position of the object detected by the detector in a quicker manner.

9. The image generation method according to claim 8, further comprising the step of:

(e) deriving, by the microcomputer, a risk level of each of a plurality of objects in a case where the detector has detected the plurality of objects, the risk level being a degree of possibility of each of the plurality of objects to come into contact with the vehicle, wherein on the object position is a position of one object of the plurality of objects having a greatest risk level.

10. The image generation method according to claim 9, wherein the step (e) derives the risk level of each of the plurality of objects based on a position of each of the plurality of objects.

11. The image generation method according to claim 10, wherein the step (e) derives the risk level of each of the plurality of objects based on (1) a prediction path in which the vehicle is expected to run and (2) the position of each of the plurality of objects.

12. The image generation method according to claim 8, wherein the step (b) causes a rotation speed of the center point of the virtual viewpoint around the vehicle to be slower than a normal rotation speed in a case where a sight line of the virtual viewpoint is directed toward the object, and the step (b) causes the rotation speed of the center point of the virtual viewpoint around the vehicle to be faster than the normal rotation speed in a case where the sight line of the virtual viewpoint is directed toward a region not including the object.

13. The image generation method according to claim 8, wherein the step (b) changes the position of the virtual viewpoint so as to direct a sight line of the virtual viewpoint only toward the object by skipping a region not including the object in the vicinity of the vehicle.

14. A non-transitory computer-readable recording medium that stores a program to be executed by a computer that is used in a vehicle, the program causing the computer to execute the steps of:

(a) temporally continuously generating a plurality of virtual viewpoint images showing a vicinity of the vehicle viewed from a virtual viewpoint, using a plurality of captured images acquired by a plurality of cameras;

(b) temporally continuously changing a position of a center point of the virtual viewpoint around the vehicle so that the plurality of virtual viewpoint images is from a different virtual viewpoint around the vehicle and the plurality of virtual viewpoint images appear to be a moving image showing the vicinity of the vehicle in such a way as to go around the vicinity of the vehicle;

(c) acquiring a detection result from a detector that detects an object existing in the vicinity of the vehicle; and (d) based on an object position of the object detected by the detector, determining a rotation direction of the center point of the virtual viewpoint around the vehicle to be either a clockwise direction or a counter-clockwise direction depending on which of the clockwise and counterclockwise directions causes the center point of the virtual viewpoint to approach the object position of the object detected by the detector in a quicker manner.

15. The recording medium according to claim 14, wherein the program further causes the computer to execute the step of:

(e) deriving a risk level of each of a plurality of objects in a case where the detector has detected the plurality of objects, the risk level being a degree of possibility of each of the plurality of objects to come into contact with the vehicle, wherein the object position is a position of one object of the plurality of objects having a greatest risk level.

16. The recording medium according to claim 15, wherein the step (e) derives the risk level of each of the plurality of objects based on a position of each of the plurality of objects.

17. The recording medium according to claim 16, wherein the step (e) derives the risk level of each of the plurality of objects based on (1) a prediction path in which the vehicle is expected to run and (2) the position of each of the plurality of objects.

18. The recording medium according to claim 14, wherein the step (b) causes a rotation speed of the center point of the virtual viewpoint around the vehicle to be slower than a normal rotation speed in a case where a sight line of the virtual viewpoint is directed toward the object, and the step (b) causes the rotation speed of the center point of the virtual viewpoint around the vehicle to be faster than the normal rotation speed in a case where the sight line of the virtual viewpoint is directed toward a region not including the object.

19. The recording medium according to claim 14, wherein the step (b) changes the position of the virtual viewpoint so as to direct a sight line of the virtual viewpoint only toward the object by skipping a region not including the object in the vicinity of the vehicle.

* * * * *